US011162546B2

(12) United States Patent
Ono et al.

(10) Patent No.: US 11,162,546 B2
(45) Date of Patent: Nov. 2, 2021

(54) CLUTCH CONTROL DEVICE

(71) Applicant: HONDA MOTOR CO., LTD., Tokyo (JP)

(72) Inventors: Junya Ono, Wako (JP); Tatsuya Ryuzaki, Wako (JP); Go Morita, Wako (JP); Kohei Matsuura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/759,746

(22) PCT Filed: Aug. 9, 2018

(86) PCT No.: PCT/JP2018/029918
§ 371 (c)(1),
(2) Date: Apr. 28, 2020

(87) PCT Pub. No.: WO2019/087512
PCT Pub. Date: May 9, 2019

(65) Prior Publication Data
US 2020/0332844 A1    Oct. 22, 2020

(30) Foreign Application Priority Data

Oct. 31, 2017    (JP) .............................. JP2017-210752

(51) Int. Cl.
*F16D 48/02* (2006.01)
*F16D 48/06* (2006.01)
(52) U.S. Cl.
CPC ............. *F16D 48/02* (2013.01); *F16D 48/06* (2013.01); *F16D 2500/1026* (2013.01)
(58) Field of Classification Search
CPC .. F16D 48/02; F16D 48/06; F16D 2500/1026; F16D 48/066;
(Continued)

(56) References Cited

U.S. PATENT DOCUMENTS

| 5,954,176 A | 9/1999 | Ishihara et al. |
| 2010/0298094 A1 | 11/2010 | Oda et al. |

(Continued)

FOREIGN PATENT DOCUMENTS

| CN | 2223211 | 3/1996 |
| CN | 1316349 | 10/2001 |

(Continued)

OTHER PUBLICATIONS

Extended European Search Report for European Patent Application No. 18872092.4 dated Oct. 21, 2020.
(Continued)

*Primary Examiner* — David J Hlavka
(74) *Attorney, Agent, or Firm* — Amin, Turocy & Watson, LLP

(57) ABSTRACT

This clutch control device includes an engine (13), a transmission gear (21), a clutch device (26), a clutch actuator (50), a control unit (60), a control parameter sensor (58), a clutch operator (4b), and a clutch operation amount sensor (4c), wherein the control unit (60) is configured to enable intervention of a manual clutch operation according to the clutch operator (4b) during automatic control of the clutch device (26) according to the clutch actuator (50), and the control unit (60) is configured to set a control target value of a clutch capacity to a connection preparation target value (Py) acquired by causing an operation target value (Pv) corresponding to an amount of operation of the clutch operator (4b) to approach a disconnection determination value (Pz) in a case in which a control parameter detected by the control parameter sensor (58) reaches the disconnection determination value (Pz) set in advance at a time of performing a clutch disconnection operation through intervention of the manual clutch operation.

7 Claims, 12 Drawing Sheets

(58) Field of Classification Search
CPC ... F16D 2500/31413; F16D 2500/5029; F16D 2500/10412; F16D 2500/1082; F16D 2500/3021; F16D 2500/30421; F16D 2500/1045; F16D 2500/1117; F16D 2500/7044

See application file for complete search history.

(56) References Cited

U.S. PATENT DOCUMENTS

| | | |
|---|---|---|
| 2011/0125377 A1 | 5/2011 | Saitoh |
| 2014/0090498 A1 | 4/2014 | Kojima et al. |
| 2014/0095033 A1 | 4/2014 | Kojima et al. |
| 2014/0095041 A1 | 4/2014 | Nakamura et al. |
| 2015/0080177 A1 | 3/2015 | Sakamoto et al. |
| 2017/0210442 A1 | 7/2017 | Aguilar |

FOREIGN PATENT DOCUMENTS

| | | |
|---|---|---|
| CN | 101680501 | 3/2010 |
| CN | 102112784 | 6/2011 |
| CN | 102141143 | 8/2011 |
| CN | 104048032 | 9/2014 |
| CN | 105299211 | 2/2016 |
| CN | 106471290 | 3/2017 |
| CN | 107161136 | 9/2017 |
| DE | 102014212723 | 10/2018 |
| EP | 1593869 | 11/2005 |
| EP | 1936224 | 6/2008 |
| EP | 2713079 | 4/2014 |
| EP | 2325513 | 5/2014 |
| JP | 60-069855 | 5/1985 |
| JP | 04-062928 | 5/1992 |
| JP | 10-141390 | 5/1998 |
| JP | 2001-289266 | 10/2001 |
| JP | 2003-278805 | 10/2003 |
| JP | 2005-024082 | 1/2005 |
| JP | 2009-079607 | 4/2009 |
| JP | 2010-270804 | 12/2010 |
| JP | 2011-112094 | 6/2011 |
| JP | 2014-070680 | 4/2014 |
| JP | 2014-070681 | 4/2014 |
| JP | 2014-070682 | 4/2014 |
| JP | 2014-070687 | 4/2014 |
| JP | 2014-070705 | 4/2014 |
| JP | 6329189 | 5/2018 |
| WO | 2014/135831 | 9/2014 |

OTHER PUBLICATIONS

International Search Report and Written Opinion for International Application No. PCT/JP2018/029918 dated Nov. 13, 2018, 7 pages.
Chinese Office Action for Chinese Patent Application No. 201880069898.4 dated Mar. 11, 2021.
International Search Report and Written Opinion for International Application No. PCT/JP2018/029907 dated Nov. 13, 2018, 8 pages.
Extended European Search Report for European Patent Application No. 18872091.6 dated Aug. 31, 2020.
Chinese Office Action for Chinese Patent Application No. 201880069185.8 dated Feb. 7, 2021.

CLUTCH CONTROL DEVICE

TECHNICAL FIELD

The present invention relates to a clutch control device.

The present application claims priority based on Japanese Patent Application No. 2017-210752 filed on Oct. 31, 2017, the contents of which are incorporated herein by reference.

BACKGROUND ART

Conventionally, there is a technology enabling intervention of a manual operation using a clutch lever during automatic control of a clutch according to an actuator (for example, see Patent Document 1).

In Patent Document 1, in order to smoothly execute intervention of a manual operation at the time of performing automatic control of a clutch, in a state in which a difference between a clutch capacity during automatic control and a calculated value of a manually-operated clutch capacity is large, conversion into the calculated value of the manually-operated clutch capacity is blocked, and a sudden change in the clutch capacity is avoided, whereby a manual operation can be intervened without causing any strange feeling.

RELATED ART DOCUMENT

Patent Document

Patent Document 1: Japanese Unexamined Patent Application, First Publication No. 2014-070681

SUMMARY

Problems to be Solved by the Invention

However, in the conventional technology described above, after intervention of a manual operation according to a clutch lever (a clutch disconnecting operation), connection performance (responsiveness) at the time of reconnecting the clutch has not been mentioned.

In other words, in a case in which a clutch capacity is controlled using a hydraulic pressure, a friction (pressure drop) occurs in a hydraulic pressure passage, and accordingly, a delay in the following of a slave hydraulic pressure for a target hydraulic pressure occurs, and the operation of the clutch may be delayed. Particularly, in a case in which a clutch capacity is controlled by a manual operation, a target hydraulic pressure is set to a hydraulic pressure that is equal to or lower than a hydraulic pressure for which the clutch is sufficiently disconnected, and accordingly, a time for raising the hydraulic pressure is required when the clutch is reconnected, connection of the clutch is delayed, whereby response is recognized as being poor.

An object of the present invention is to provide a clutch control device capable of improving connection performance of a clutch when a manual operation is intervened during automatic control of the clutch.

Means for Solving the Problem

As resolving means of the problems described above, aspects of the present invention have the following configurations.

(1) A clutch control device according to an aspect of the present invention includes: an engine; a transmission gear; a clutch device that is configured to connect/disconnect transmission of power between the engine and the transmission gear; a clutch actuator that is configured to change a clutch capacity by driving the clutch device; a control unit that is configured to calculate a control target value of the clutch capacity; a control parameter sensor that is configured to detect an actual control parameter for the control target value; a clutch operator that is configured to enable the clutch device to be manually operated; and a clutch operation amount sensor that is configured to convert an amount of operation of the clutch operator into an electric signal, wherein the control unit is configured to enable intervention of a manual clutch operation according to the clutch operator during automatic control of the clutch device according to the clutch actuator, and the control unit is configured to set the control target value of the clutch capacity to a connection preparation target value acquired by causing an operation target value corresponding to the amount of operation of the clutch operator to approach a disconnection determination value in a case in which the control parameter detected by the control parameter sensor reaches the disconnection determination value set in advance at a time of performing a clutch disconnection operation through intervention of the manual clutch operation.

(2) In the clutch control device described in (1) described above, the control unit may be configured to transition to clutch control based on the operation target value in a case in which the operation target value exceeds the connection preparation target value to a clutch connection side in a clutch disconnected state formed through the intervention of the manual clutch operation.

(3) In the clutch control device described in (1) or (2) described above, the control unit may be configured to set the control target value of the clutch capacity to an automatic control target value separated from the manual clutch operation in a case in which the clutch operator is operated to a clutch connection side and exceeds an intervention determination operation amount on the basis of an output value of the clutch operation amount sensor.

(4) In the clutch control device described in any one of (1) to (3) described above, the disconnection determination value may be a value at which it can be determined that there is no dragging in the clutch device.

(5) In the clutch control device described in any one of (1) to (4) described above, the clutch operator may be a clutch lever, and an operation of the clutch lever may be detected using a rotation angle of the clutch lever.

(6) In the clutch control device described in any one of (1) to (5) described above, the clutch capacity may be controlled using hydraulic pressure.

(7) In the clutch control device described in (6) described above, the clutch capacity may decrease and disconnect the clutch device when the hydraulic pressure is lowered.

Advantage of the Invention

According to the clutch control device described in above-described (1) of the present invention, the control target value of the clutch capacity can be changed with being disconnected from an operation of the clutch operator so as to be maintained at a connection preparation target value corresponding to a target value immediately before the start of connection of the clutch device. In other words, before the operation position of the clutch operator is returned to a clutch connection position after disconnection of the clutch, the clutch device can be caused to be in a prior connection start state in advance. For this reason, a delay in the operation of the clutch device for the operation of the clutch operator can be inhibited, and the connection performance (responsiveness) of the clutch device at the time of intervention of the manual clutch operation can be improved.

According to the clutch control device described in above-described (2) of the present invention, in a case in which the operation target value corresponding to the amount of operation of the clutch operator exceeds the connection preparation target value to the clutch connection side, the clutch capacity is controlled on the basis of the operation target value, and accordingly, a user can perform an operation of connecting of the clutch device in proportion to the amount of operation by performing a manual clutch operation.

According to the clutch control device described in above-described (3) of the present invention, in a case in which the clutch operator is operated to the clutch connection side and reaches a predetermined operation amount, the intervention of the manual clutch operation is regarded to end in accordance with a user request, and the process can be continuously switched to automatic control.

According to the clutch control device described in above-described (4) of the present invention, the connection preparation target value can be set immediately before a state in which the clutch device is completely disconnected, and the clutch device can be connected quickly such that a user request is reflected after the operation target value exceeds the connection preparation target value in accordance with a user operation.

According to the clutch control device described in above-described (5) of the present invention, a timing at which disconnection of the clutch is requested by a user can be detected stably and accurately.

According to the clutch control device described in above-described (6) and (7) of the present invention, a transmission delay of a drive force between the clutch actuator and the clutch device due to flow resistance (a pressure drop) of the hydraulic pressure can be inhibited.

DESCRIPTION OF THE EMBODIMENTS

Hereinafter, an embodiment of the present invention will be described with reference to the drawings. In addition, in the following description, directions such as forward, rearward, left, right, and the like are the same as those in a vehicle to be described below unless otherwise mentioned. Furthermore, an arrow FR representing a vehicle front side, an arrow LH representing a vehicle left side, and an arrow UP representing a vehicle upper side are illustrated at appropriate places in drawings used in the following description.

<Whole Vehicle>

Figure 1:
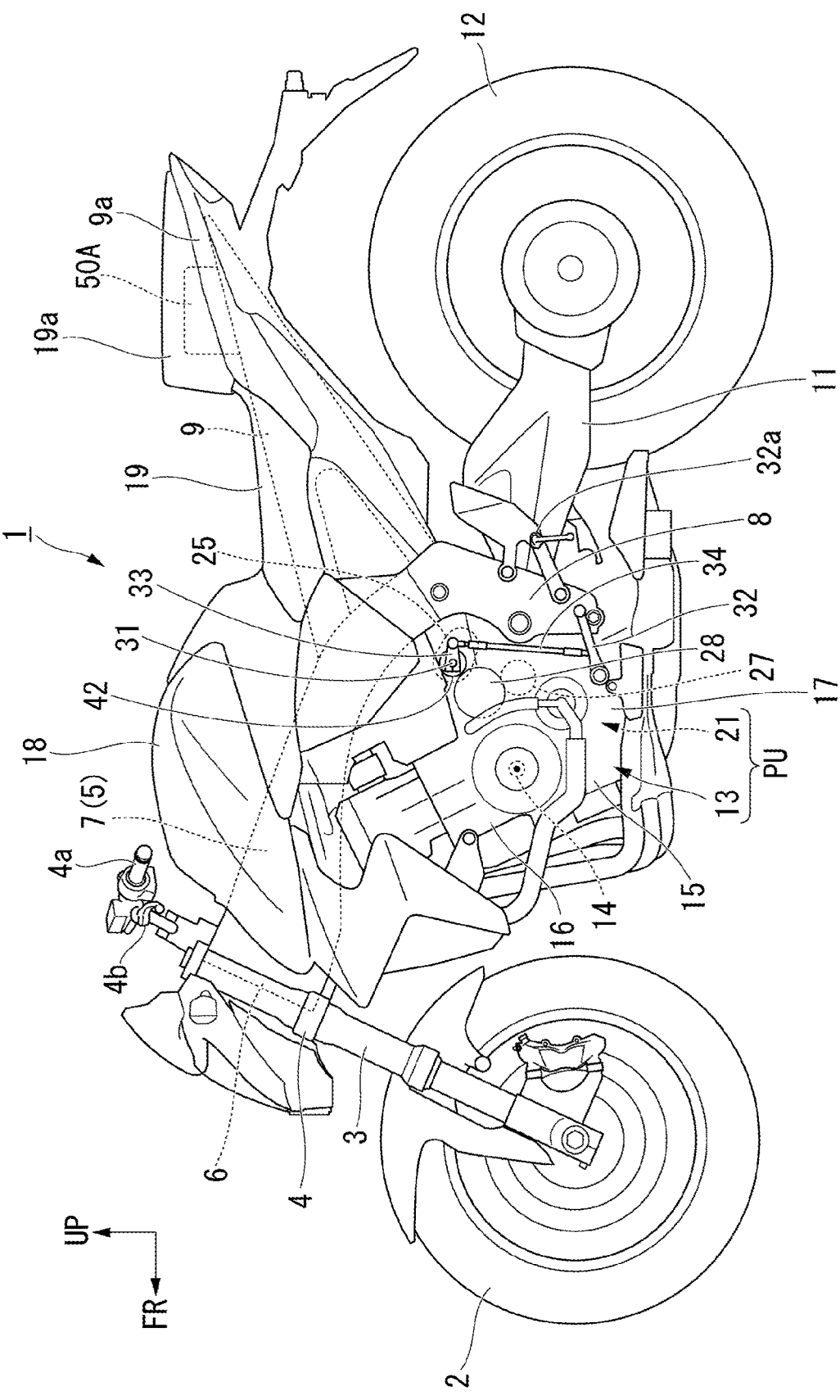
FIG. 1 is a left side view of a motorcycle according to an embodiment of the present invention.

As illustrated in FIG. 1, this embodiment is applied to a motorcycle 1 that is a saddle riding-type vehicle. A front wheel 2 of the motorcycle 1 is supported by lower ends of one pair of left and right front forks 3. Upper parts of the left and right front forks 3 are supported by a head pipe 6 of a front end of a vehicle body frame 5 through a steering stem 4. A bar-type steering handle 4a is mounted on a top bridge of the steering stem 4.

The vehicle body frame 5 includes a head pipe 6, a main tube 7 that extends from the head pipe 6 toward a rear lower side at the center in a vehicle width direction (leftward/rightward direction), left and right pivot frames 8 connected to a lower side of a rear end of the main tube 7, and a seat frame 9 connected to the rear side of the main tube 7 and the left and right pivot frames 8. In the left and right pivot frames 8, a front end of a swing arm 11 is pivoted to be swingable. At a rear end of the swing arm 11, a rear wheel 12 of the motorcycle 1 is supported.

On an upper side of the left and right main tubes 7, a fuel tank 18 is supported. On a side behind the fuel tank 18, a front seat 19 and a rear seat cover 19a are aligned in front of and behind each other and supported on an upper side of the seat frame 9. The periphery of the seat frame 9 is covered with a rear cowl 9a. Below the left and right main tubes 7, a power unit PU that is a motor of the motorcycle 1 is suspended. The power unit PU is linked with the rear wheel 12, for example, through a chain-type transmission mechanism.

The power unit PU integrally includes an engine (internal combustion engine) 13 positioned on the front side thereof and a transmission gear 21 positioned on the rear side. The engine 13, for example, is a multiple cylinder engine in which a rotary shaft of a crank shaft 14 is aligned along the leftward/rightward direction (vehicle width direction). The engine 13 raises a cylinder 16 above a front part of a crank case 15. A rear part of the crank case 15 is formed as a transmission case 17 that houses the transmission gear 21.

<Transmission Gear>

Figure 2:
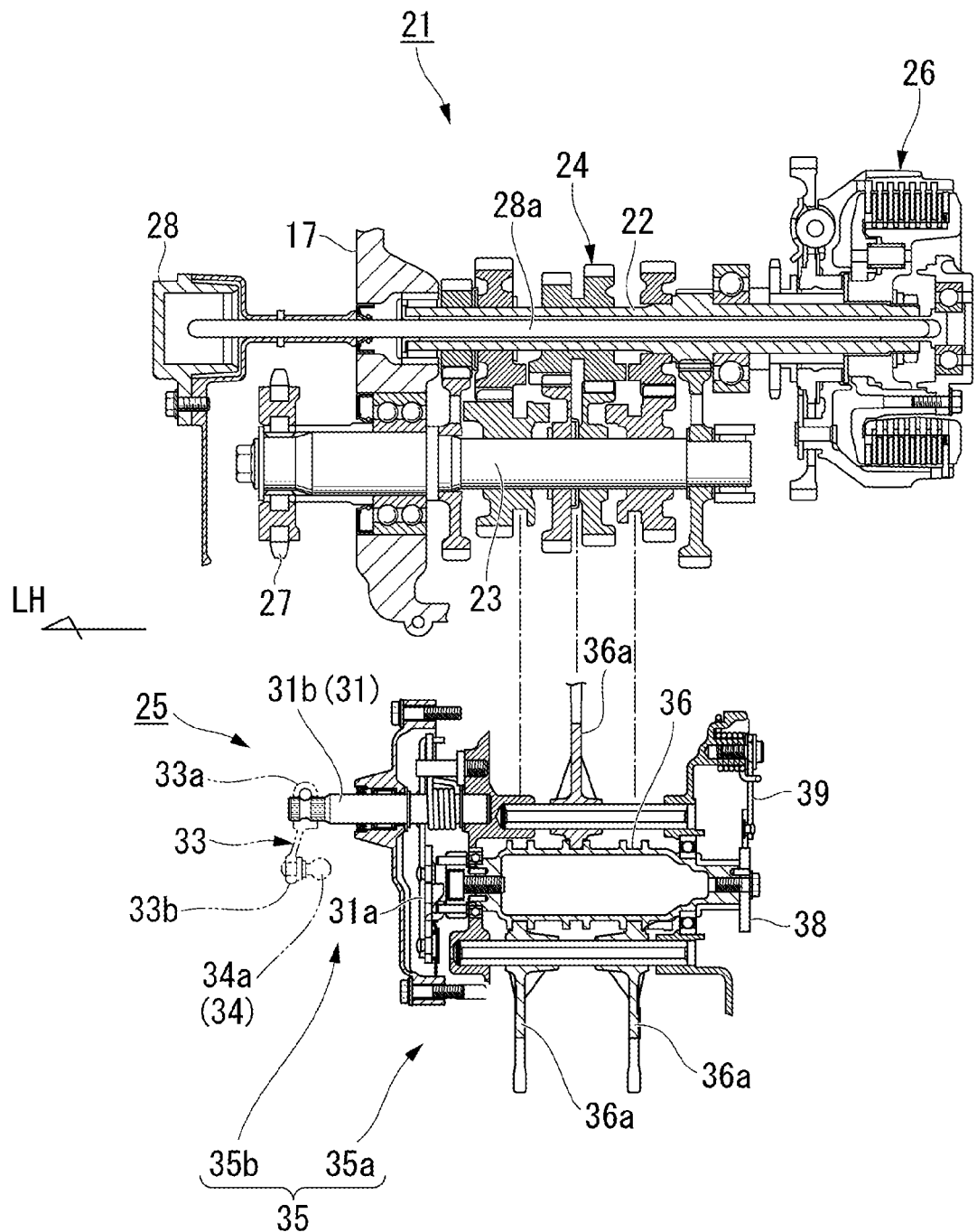
FIG. 2 is a cross-sectional view of a transmission gear and a change mechanism of the motorcycle.

As illustrated in FIG. 2, the transmission gear 21 is a stepped transmission including a main shaft 22, a counter shaft 23, and a transmission gear group 24 disposed across both the shafts 22 and 23. The counter shaft 23 configures an output shaft of not only the transmission gear 21 but also the power unit PU. An end of the counter shaft 23 protrudes to the left side of a rear part of the crank case 15 and is connected to the rear wheel 12 through the chain-type transmission mechanism.

The transmission gear group 24 includes gears corresponding to the number of transmission steps supported at both the shafts 22 and 23. The transmission gear 21 is a constant mesh type in which a pair of corresponding gears of the transmission gear group 24 are constantly engaged with each other between both the shafts 22 and 23. A plurality of gears supported at both the shafts 22 and 23 can be classified into a free gear that can rotate with respect to a corresponding shaft and a slide gear (shifter) that is spline-fitted to a corresponding shaft. On one side of the free gear and the slide gear, a convex dog is disposed in the axial direction, and, on the other side, a concave slot is disposed in the axial direction so as to be engaged with the dog. In other words, the transmission gear 21 is a so-called dog mission.

Figure 3:
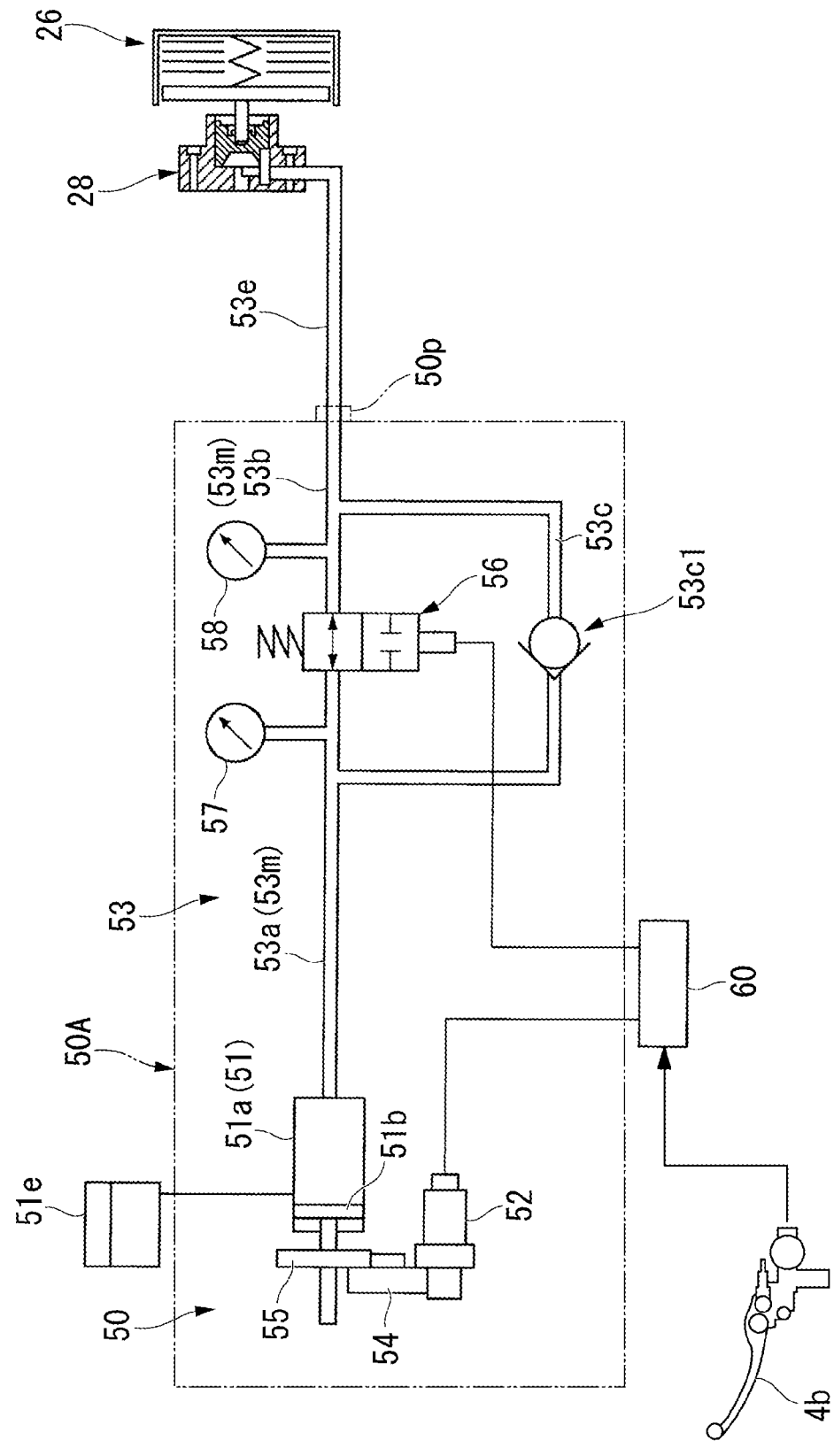
FIG. 3 is a schematic explanatory diagram of a clutch operating system including a clutch actuator.

Referring to FIG. 3, the main shaft 22 and the counter shaft 23 of the transmission gear 21 are arranged to be aligned in front of and behind each other on the side behind the crank shaft 14. At a right end of the main shaft 22, a clutch device 26 operated by a clutch actuator 50 is coaxially disposed. The clutch device 26, for example, is a wet multiplate clutch and a so-called normal open clutch. In other words, the clutch device 26 reaches a connection state in which power can be transmitted in accordance with the supply of a hydraulic pressure from the clutch actuator 50 and is returned to a disconnected state in which power cannot be transmitted when the supply of the hydraulic pressure from the clutch actuator 50 disappears.

Referring to FIG. 2, the rotation power of the crank shaft 14 is transmitted to the main shaft 22 through the clutch device 26 and is transmitted from the main shaft 22 to the counter shaft 23 through an arbitrary gear pair of the transmission gear group 24. At a left end of the counter shaft 23 that protrudes to the left side of a rear part of the crank case 15, a drive sprocket 27 of the chain-type transmission mechanism is mounted.

Above the rear of the transmission gear 21, a change mechanism 25 that performs switching between gear pairs of the transmission gear group 24 is housed. The change mechanism 25 operates a plurality of shift forks 36a in accordance with the pattern of a lead groove formed on the outer periphery thereof in accordance with rotation of a shift drum 36 having a hollow cylindrical shape parallel to both the shafts 22 and 23 and performs switching of a gear pair used for power transmission between both the shafts 22 and 23 in the transmission gear group 24.

The change mechanism 25 includes a shift spindle 31 parallel to the shift drum 36. At the time of rotation of the shift spindle 31, a shift arm 31a fixed to the shift spindle 31 rotates the shift drum 36, moves the shift fork 36a in the axial direction in accordance with the pattern of the lead groove, and switches a gear pair that can transmit power in the transmission gear group 24 (in other words, a transmission step is changed).

The shift spindle 31 causes a shaft outer part 31b to protrude to an outward side (left side) of the crank case 15 in the vehicle width direction such that the change mechanism 25 can be operated. A shift load sensor 42 (a shift operation detecting means) is coaxially mounted in the shaft outer part 31b of the shift spindle 31 (see FIG. 1). A swing lever 33 is mounted in the shaft outer part 31b (or a rotation shaft of the shift load sensor 42) of the shift spindle 31. The swing lever 33 extends from a base end part 33a that is fixed to the shift spindle 31 (or the rotation shaft) through clamp fixing to the rear side, and an upper end of a link load 34 is connected to a tip end part 33b thereof through an upper ball joint 34a to be freely swingable. A lower end of the link load 34 is connected to a shift pedal 32 that is operated by a driver using a foot through a lower ball joint (not illustrated in the drawing) to be swingable.

As illustrated in FIG. 1, the shift pedal 32 has a front end supported at a lower part of the crank case 15 to be vertically swingable through a shaft along a leftward/rightward direction. A pedal part on which a driver's toes in a step 32a are placed is disposed in a rear end of the shift pedal 32, and a lower end of the link load 34 is connected to a middle part before and after the shift pedal 32.

As illustrated in FIG. 2, a shift change device 35 that includes the shift pedal 32, the link load 34, and the change mechanism 25 and performs switching of a transmission step gear of the transmission gear 21 is configured. In the shift change device 35, an assembly (the shift drum 36, the shift forks 36a, and the like) that switches a transmission step of the transmission gear 21 inside the transmission case 17 will be referred to as a transmission operating unit 35a, and an assembly (the shift spindle 31, the shift arm 31a, and the like) to which a transmission operation for the shift pedal 32 is input and rotates around the shift spindle 31 and transmits this rotation to the transmission operating unit 35a will be referred to as a transmission operation receiving unit 35b.

Here, the motorcycle 1 employs a so-called semi-automatic transmission system (an automatic clutch-type speed change system) in which only a transmission operation of the transmission gear 21 (a foot operation of the shift pedal 32) is performed by a driver, and a coupling/decoupling operation of the clutch device 26 is automatically performed through electrical control in accordance with an operation on the shift pedal 32.

<Speed Change System>

Figure 4:
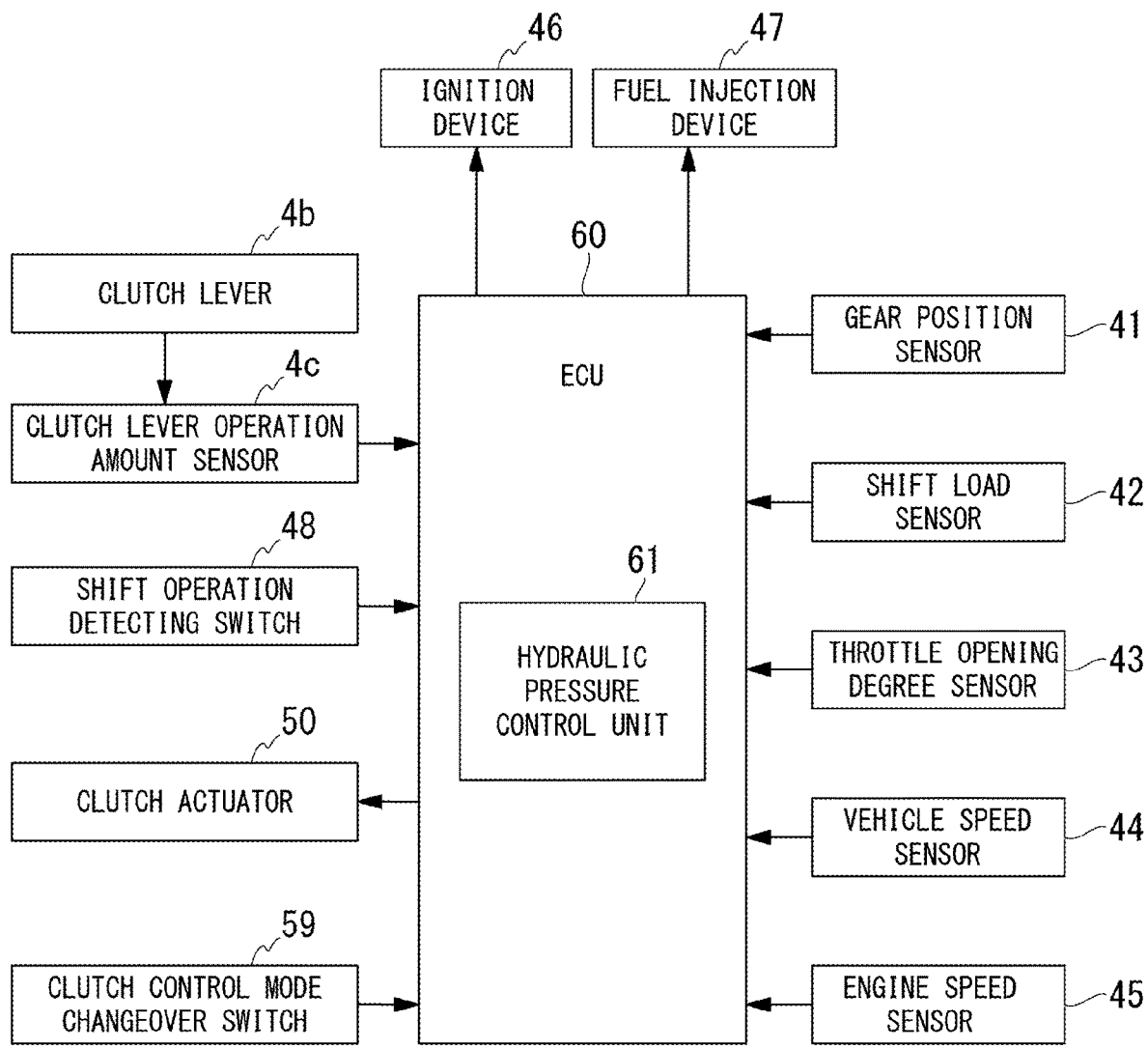
FIG. 4 is a block diagram of a transmission system.

As illustrated in FIG. 4, the transmission system described above includes a clutch actuator 50, an electronic control unit (ECU; control device) 60, and various sensors 41 to 45.

The ECU (control unit) 60 controls the operation of an ignition device 46 and a fuel injection device 47 together with controlling the operation of the clutch actuator 50 on the basis of detection information from a gear position sensor 41 detecting a transmission step from a rotation angle of the shift drum 36 and the shift load sensor (for example, torque sensor) 42 detecting an operation torque input to the shift spindle 31 and various types of vehicle state detection information from a throttle opening degree sensor 43, a vehicle speed sensor 44, and an engine speed sensor 45, and the like. Detection information from hydraulic pressure sensors 57 and 58 and a shift operation detecting switch (a shift neutral switch) 48 to be described later is also input to the ECU 60.

In addition, the ECU 60 includes a hydraulic pressure control unit (clutch control unit) 61, and such a function will be described later.

Referring also to FIG. 3, the clutch actuator 50 can control a liquid pressure used for coupling/decoupling the clutch device 26 by being controlled such that it operates by the ECU 60. The clutch actuator 50 includes an electric motor 52 (hereinafter, simply referred to as a motor 52) as a drive source and a master cylinder 51 driven by the motor 52. The clutch actuator 50 configures a clutch control unit 50A as one body together with the hydraulic pressure circuit device 53 disposed between the master cylinder 51 and a hydraulic pressure supply-discharge port 50p.

The ECU 60 calculates a target value of a hydraulic pressure (target hydraulic pressure) supplied to a slave cylinder 28 for coupling/decoupling the clutch device 26 on the basis of a calculation program set in advance and controls the clutch control unit 50A such that a hydraulic pressure (a slave hydraulic pressure) of the slave cylinder 28 side that is detected by a downstream-side hydraulic pressure sensor 58 is close to the target hydraulic pressure.

The master cylinder 51 causes a piston 51b inside a cylinder main body 51a to perform a stroke in accordance with driving of the motor 52 and enables the supply/discharge of hydraulic oil inside the cylinder main body 51a for the slave cylinder 28. In addition, in the drawing, a reference numeral 55 represents a conversion mechanism as a ball screw mechanism, a reference numeral 54 represents a transmission mechanism disposed across the motor 52 and the conversion mechanism 55, and a reference numeral 51e represents a reservoir connected to the master cylinder 51.

The hydraulic pressure circuit device 53 includes a valve mechanism (a solenoid valve 56) opening or blocking a middle portion of a main oil path (a hydraulic pressure supply/discharge oil path) 53m extending from the master cylinder 51 to the clutch device 26 side (the slave cylinder 28 side). The main oil path 53m of the hydraulic pressure circuit device 53 can be divided into an upstream-side oil path 53a that is on the master cylinder 51 side from the solenoid valve 56 and a downstream-side oil path 53b that is on the slave cylinder 28 side from the solenoid valve 56. In addition, the hydraulic pressure circuit device 53 includes a bypass oil path 53c that bypasses the solenoid valve 56 and causes the upstream-side oil path 53a and the downstream-side oil path 53b to communicate with each other.

The solenoid valve 56 is a so-called normal open valve. A one-way valve 53c1 causing a hydraulic oil to flow in only one way from the upstream side to the downstream side is disposed in the bypass oil path 53c. On the upstream side of the solenoid valve 56, an upstream-side hydraulic pressure sensor 57 detecting a hydraulic pressure of the upstream-side oil path 53a is disposed. On the downstream side of the solenoid valve 56, a downstream-side hydraulic pressure sensor 58 detecting a hydraulic pressure of the downstream-side oil path 53b is disposed.

As illustrated in FIG. 1, the clutch control unit 50A, for example, is housed in the rear cowl 9a. The slave cylinder 28 is mounted on the left side of the rear part of the crank case 15. The clutch control unit 50A and the slave cylinder 28 are connected through a hydraulic piping 53e (see FIG. 3).

As illustrated in FIG. 2, the slave cylinder 28 is coaxially disposed on the left side of the main shaft 22. When a hydraulic pressure is supplied from the clutch actuator 50, the slave cylinder 28 presses a push load 28a passing through the inside of the main shaft 22 to the right side. By pressing the push load 28a to the right side, the slave cylinder 28 operates the clutch device 26 to be in a connected state through the push load 28a. When the supply of the hydraulic pressure disappears, the slave cylinder 28 releases the pressing of the push load 28a and returns the clutch device 26 to a disconnected state.

In order to maintain the clutch device 26 to be in the connected state, it is necessary to continue the supply of the hydraulic pressure, and power is consumed as that much. Thus, as illustrated in FIG. 3, the solenoid valve 56 is disposed in the hydraulic pressure circuit device 53 of the clutch control unit 50A, and the solenoid valve 56 is closed after the supply of the hydraulic pressure to the clutch device 26 side. In this way, the hydraulic pressure supplied to the clutch device 26 side is maintained, and a hydraulic pressure corresponding to a decrease in the pressure is configured to be supplemented (recharged by an amount corresponding to a leak), whereby the energy consumption is inhibited.

<Clutch Control>

Next, an action of a clutch control system will be described with reference to a graph illustrated in FIG. 5. In the graph illustrated in FIG. 5, the vertical axis represents a supplied hydraulic pressure detected by the downstream-side hydraulic pressure sensor 58, and the horizontal axis represents an elapsed time.

At the time of stopping (idling) of the motorcycle 1, both the motor 52 and the solenoid valve 56 controlled by the ECU 60 are in a state in which the supply of power is blocked. In other words, the motor 52 is in a stop state, and the solenoid valve 56 is in an open-valve state. At this time, the slave cylinder 28 side (the downstream side) is in a low-pressure state having a pressure lower than a touch point hydraulic pressure TP, and the clutch device 26 is in a non-fastened state (a disconnected state, a released state). This state corresponds to an area A illustrated in FIG. 5.

At the time of starting the motorcycle 1, when the speed of the engine 13 is increased, power is supplied only to the motor 52, and a hydraulic pressure is supplied from the master cylinder 51 to the slave cylinder 28 through the solenoid valve 56 that is in the open-valve state. When the hydraulic pressure of the slave cylinder 28 side (the downstream side) rises to be equal to or higher than the touch point hydraulic pressure TP, the fastening of the clutch device 26 starts, and the clutch device 26 becomes in a half-clutch state in which a part of power can be transmitted. In this way, smooth start of the motorcycle 1 can be performed. This state corresponds to an area B illustrated in FIG. 5.

Thereafter, when a difference between input rotation and output rotation of the clutch device 26 decreases, and the hydraulic pressure of the slave cylinder 28 side (the downstream side) reaches a lower limit holding hydraulic pressure LP, the fastening of the clutch device 26 transitions to a locked state, and all the driving force of the engine 13 is transmitted to the transmission gear 21. This state corresponds to an area C illustrated in FIG. 5. The areas A to C form a starting area.

In order to supply a hydraulic pressure from the master cylinder 51 side to the slave cylinder 28 side, the solenoid valve 56 is caused to be in the open-valve state, the motor 52 is driven to rotate in normal direction through conduction, and the master cylinder 51 is pressed. In this way, the hydraulic pressure of the slave cylinder 28 side is adjusted to a clutch fastening hydraulic pressure. At this time, the driving of the clutch actuator 50 is controlled through feedback based on a detected hydraulic pressure acquired by the downstream-side hydraulic pressure sensor 58.

Then, when the hydraulic pressure of the slave cylinder 28 side (the downstream side) reaches an upper limit holding hydraulic pressure HP, power is supplied to the solenoid valve 56, and the solenoid valve 56 operates to be closed, and the supply of power to the motor 52 is stopped, and the generation of the hydraulic pressure is stopped. In other words, the upstream side becomes in a low pressure state in accordance with release of the hydraulic pressure, and the downstream side is maintained to be in the high pressure state (the upper limit holding hydraulic pressure HP). In this way, the clutch device 26 is maintained to be in the fastened state without the master cylinder 51 generating a hydraulic pressure, and the power consumption can be inhibited while running of the motorcycle 1 is enabled.

Here, depending on a transmission operation, there may be also cases in which transmission is performed immediately after a hydraulic pressure is filled in the clutch device 26. In such a case, before the solenoid valve 56 operates to be closed to cause the upstream side to be in a low pressure state, the motor 52 is reversely driven in an open-valve state of the solenoid valve 56, the master cylinder 51 is decompressed and is caused to communicate with the reservoir 51e, and the hydraulic pressure of the clutch device 26 side is relieved on the master cylinder 51 side. At this time, the driving of the clutch actuator 50 is controlled through feedback on the basis of a detected hydraulic pressure acquired by the upstream-side hydraulic pressure sensor 57.

Figure 5:
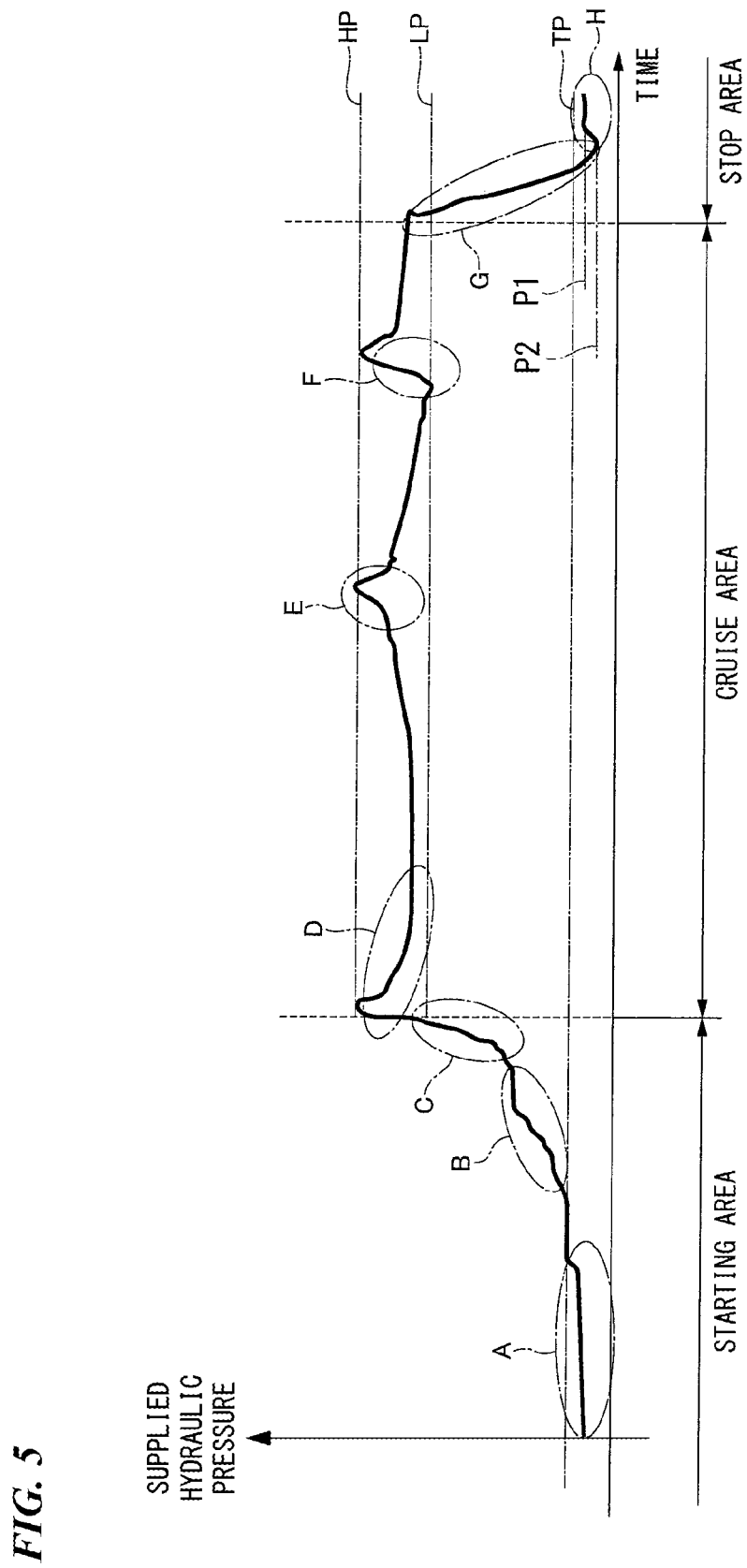
FIG. 5 is a graph illustrating changes in supplied hydraulic pressure of a clutch actuator.

Even in a state in which the solenoid valve 56 is closed, and the clutch device 26 is maintained to be in the fastened state, as in an area D illustrated in FIG. 5, the hydraulic pressure of the downstream side gradually decreases (leaks). In other words, the hydraulic pressure of the downstream side gradually decreases in accordance with factors such as a leakage of the hydraulic pressure and a temperature decrease according to deformation and the like of seals of the solenoid valve 56 and the one-way valve 53c1.

Meanwhile, as in an area E illustrated in FIG. 5, there are also cases in which a hydraulic pressure of the downstream side rises in accordance with a rise in the temperature and the like. A fine hydraulic pressure variation of the downstream side can be absorbed by an accumulator not illustrated in the drawing, and there is no increase in power consumption according to the operating of the motor 52 and the solenoid valve 56 every time the hydraulic pressure changes.

As in an area E illustrated in FIG. 5, in a case in which a hydraulic pressure of the downstream side rises up to the upper limit holding hydraulic pressure HP, by decreasing the supply of power to the solenoid valve 56 or the like, the solenoid valve 56 is caused to be in an open-valve state in a stepped manner, and the hydraulic pressure of the downstream side is relieved toward the upstream side.

As illustrated in an area F illustrated in FIG. 5, in a case in which the hydraulic pressure of the downstream side decreases to the lower limit holding hydraulic pressure LP, the solenoid valve 56 starts to supply power to the motor 52 with the valve closed and raises the hydraulic pressure of the upstream side. When the hydraulic pressure of the upstream side is above the hydraulic pressure of the downstream side, this hydraulic pressure is supplied (recharged) to the downstream side through the bypass oil path 53c and the one-way valve 53c1. When the hydraulic pressure of the downstream side becomes the upper limit holding hydraulic pressure HP, the supply of power to the motor 52 is stopped, and the generation of the hydraulic pressure stops. In this way, the hydraulic pressure of the downstream side is maintained between the upper limit holding hydraulic pressure HP and the lower limit holding hydraulic pressure LP, and the clutch device 26 is maintained to be in the fastened state. The areas D to F are set to a cruise area.

In a case in which the transmission gear 21 becomes neutral when the motorcycle 1 stops, the supply of power to both the motor 52 and the solenoid valve 56 is stopped together. In this way, the master cylinder 51 stops the generation of a hydraulic pressure and stops the supply of a hydraulic pressure to the slave cylinder 28. The solenoid valve 56 becomes an open-valve state, and the hydraulic pressure of the inside of the downstream-side oil path 53b is returned to the reservoir 51e. As above, the slave cylinder 28 side (the downstream side) becomes a low pressure state having a hydraulic pressure lower than the touch point hydraulic pressure TP, and the clutch device 26 becomes a non-fastened state. This state corresponds to areas G and H illustrated in FIG. 5. The areas G and H will be set as a stop area.

Meanwhile, with the transmission gear 21 being in the in-gear state when the motorcycle 1 stops, a standby state in which a standby hydraulic pressure WP is applied to the slave cylinder 28 side is formed.

The standby hydraulic pressure WP is a hydraulic pressure that is slightly lower than the touch point hydraulic pressure TP for which the coupling of the clutch device 26 starts and is a hydraulic pressure (a hydraulic pressure applied in the areas A and H illustrated in FIG. 5) for which the clutch device 26 is not coupled. In accordance with the application of the standby hydraulic pressure WP, invalid filling of the clutch device 26 (cancelation of deteriorations and operating reaction forces of parts and application of preloads to a hydraulic pressure passage, and the like) can be performed, and operation responsiveness at the time of coupling the clutch device 26 is improved.

<Speed Change Control>

Next, transmission control of the motorcycle 1 will be described.

In an in-gear stop state in which the gear position of the transmission gear 21 is in an in-gear state of the first speed, and the vehicle speed is lower than a setting value corresponding to stopping, the motorcycle 1 according to this embodiment performs control of decreasing the standby hydraulic pressure WP supplied to the slave cylinder 28 when a shift operation on the shift pedal 32 from the first speed to the neutral is performed.

Here, in a case in which the motorcycle 1 is in the stop state, and the gear position of the transmission gear 21 is any one transmission step position other than the neutral, in other words, in a case in which the transmission gear 21 is in the in-gear stop state, a standby hydraulic pressure WP set in advance is supplied to the slave cylinder 28.

The standby hydraulic pressure WP is set to a first setting value P1 (see FIG. 5) that is a standard standby hydraulic pressure at a normal time (in the case of a non-detected state in which a transmission operation of the shift pedal 32 is not detected). In this way, the clutch device 26 comes into a standby state in which the invalid filling is performed, and the responsiveness at the time of clutch fastening is improved. In other words, when the speed of the engine 13 is increased by a driver increasing a throttle opening degree, fastening of the clutch device 26 is immediately started in accordance with the supply of a hydraulic pressure to the slave cylinder 28, and quick start and acceleration of the motorcycle 1 can be performed.

In order to detect a driver's shift operation on the shift pedal 32, the motorcycle 1 includes the shift operation detecting switch 48 in addition to the shift load sensor 42.

Then, in the in-gear stop state, when the shift operation detecting switch 48 detects a shift operation from the first speed to the neutral, the hydraulic pressure control unit 61 performs control of setting the standby hydraulic pressure WP to a second setting value P2 (a low standby hydraulic pressure; see FIG. 5) lower than the first setting value P1 that is a setting value before the transmission operation.

In a case in which the transmission gear 21 is in the in-gear state, a standard standby hydraulic pressure corresponding to the first setting value P1 is supplied to the slave cylinder 28 at a normal time, and accordingly, a slight pattern, so-called dragging is generated in the clutch device 26. At this time, there are cases in which a dog and a slot (dog hole) engaged with each other in the dog clutch of the transmission gear 21 press each other in the rotation direction, and resistance of engagement release is generated, and the shift operation becomes heavy. In such a case, when the standby hydraulic pressure WP supplied to the slave cylinder 28 is decreased to a low standby hydraulic pressure corresponding to the second setting value P2, the engagement between the dog and the slot can be easily released, and the shift operation becomes light.

<Shift Operation Detecting Switch>

Figure 6:
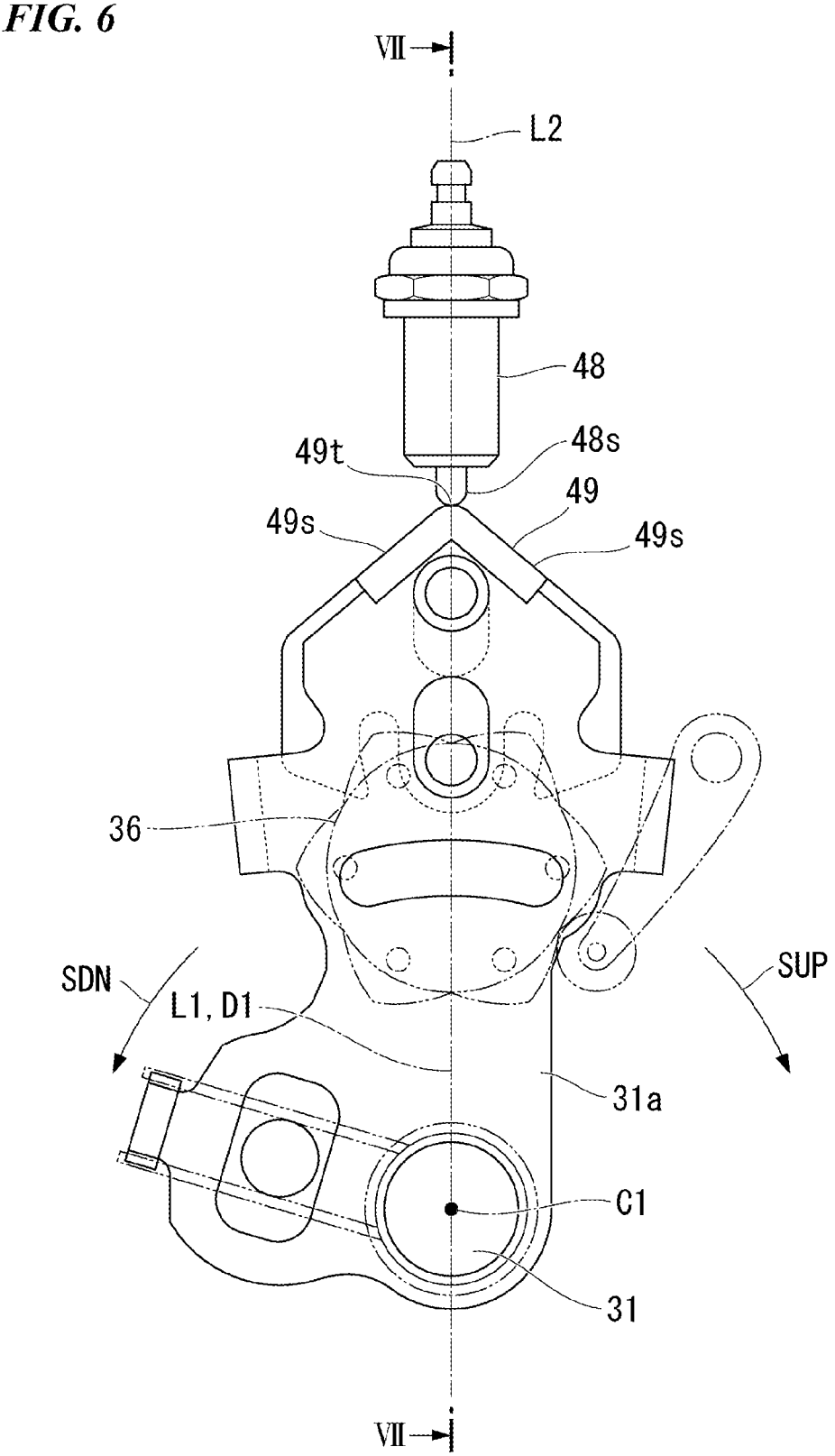
FIG. 6 is a front view of a shift arm and a shift operation detecting switch seen in an axial direction of a shift spindle.
Figure 7:
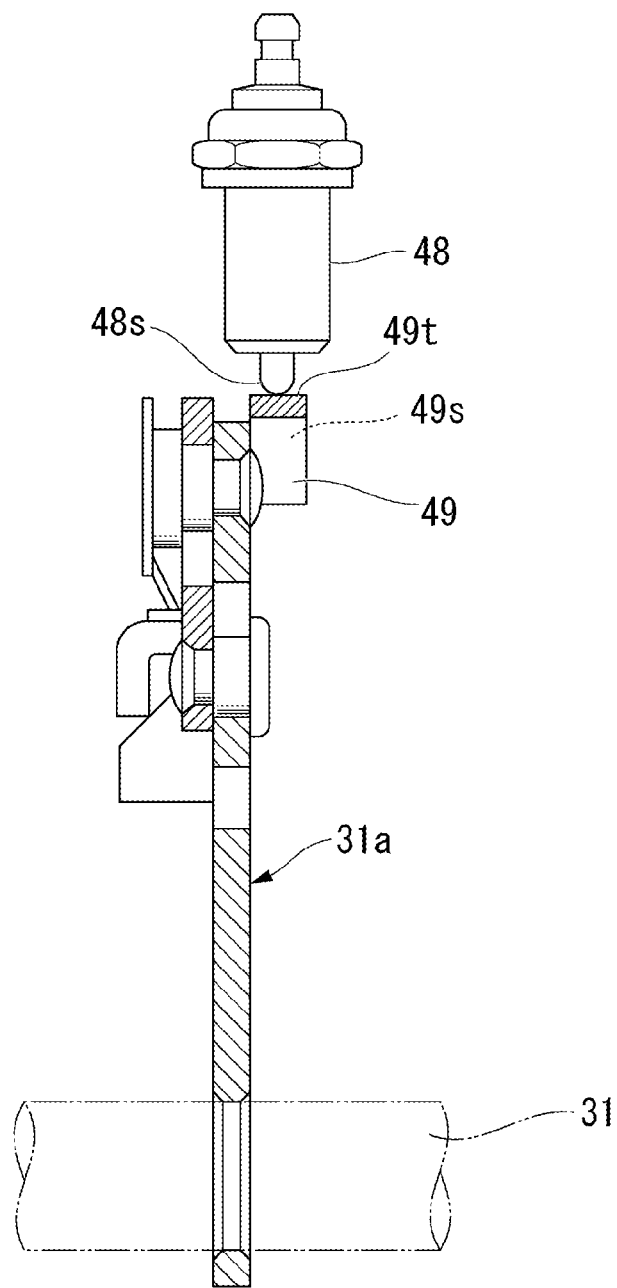
FIG. 7 is a cross-sectional view along line VII-VII illustrated in FIG. 6.

As illustrated in FIGS. 6 and 7, the shift operation detecting switch 48 is disposed to face an outer peripheral end of the shift arm 31a, which extends from the rotation center (shaft center) C1 of the shift spindle 31 to an outward side in a diameter direction, in the diameter direction. In FIG. 6, an arrow SUP represents a shift up side in the rotation direction of the shift spindle 31, and an arrow SDN represents a shift down side in the rotation direction of the shift spindle 31.

Referring to FIG. 6, the shift arm 31a extends along an extending reference line L1 passing through the shaft center C1. The shift operation detecting switch 48 is supported at the transmission case 17 side, and the shift arm 31a relatively rotates with respect to the shift operation detecting switch 48.

The shift operation detecting switch 48 forms a cylindrical shape and is disposed to have a center line L2 along the diameter direction of the shift spindle 31. The shift operation detecting switch 48 includes a probe 48s that performs stroke along the center line L2. The probe 48s protrudes toward a detection target member 49 disposed at an outer peripheral end of the shift arm 31a.

The shift arm 31a has a position at which an extending line of the extending reference line L1 coincides with the center line L2 of the shift operation detecting switch 48 as a neutral position D1. The shift arm 31a is biased toward the neutral position D1 by a return spring not illustrated in the drawing. The detection target member 49 is disposed in the outer peripheral end of the shift arm 31a to face the shift operation detecting switch 48. The detection target member 49 forms a convex "V" shape on the outward side in the diameter direction and is disposed in a symmetrical form with respect to the extending reference line L1. The detection target member 49 includes a protruding apex part 49t formed toward the outward side in the diameter direction and one pair of inclining face parts 49s formed on both sides of the protruding apex part 49t in the rotation direction of the shift spindle 31. The one pair of inclining face parts 49s are disposed to be approximately perpendicular to each other. The protruding apex part 49t is chamfered to be round with a radius equivalent to that of a tip end spherical face of the probe 48s of the shift operation detecting switch 48.

As illustrated in FIG. 6, the shift arm 31a is disposed at the neutral position D1 in a state in which an operating load from the shift pedal 32 is not applied. At this time, the protruding apex part 49t of the detection target member 49 confronts with the probe 48s of the shift operation detecting switch 48 in the diameter direction. In this way, the probe 48s of the shift operation detecting switch 48 comes into an immersion state, and the shift operation detecting switch 48 comes into an On or Off state (the On state in the drawing).

Figure 8:
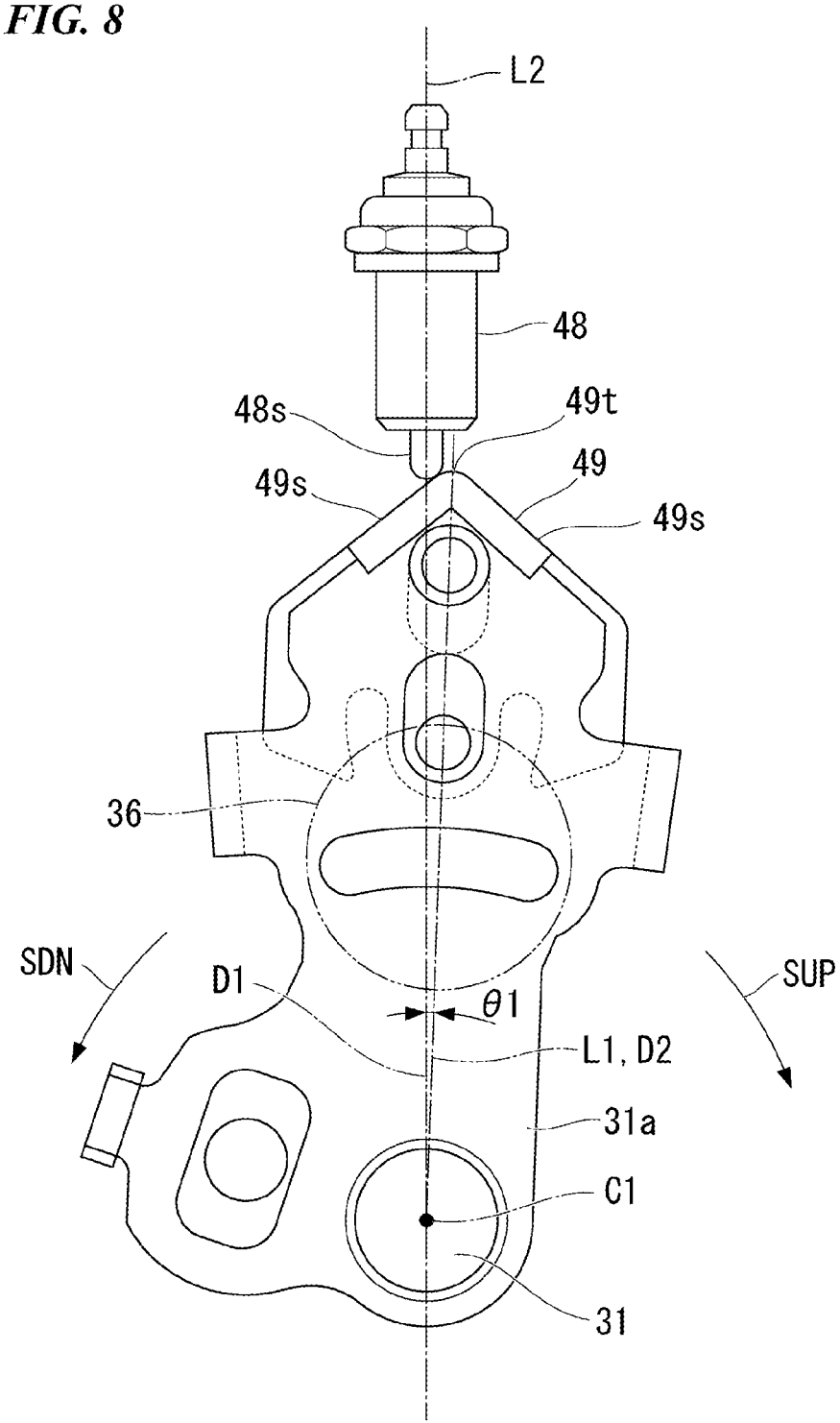
FIG. 8 is a front view of a state in which a shift operation detecting switch detects a shift operation corresponding to FIG. 6.

On the other hand, as illustrated in FIG. 8, when the shift spindle 31 rotates by applying an operation load to the shift pedal 32, the shift arm 31a also integrally rotates. In FIG. 8, the shift spindle 31 and the shift arm 31a rotate to the shift up side. When the shift arm 31a rotates, the protruding apex part 49t of the detection target member 49 displaces in the circumferential direction with respect to the probe 48s of the shift operation detecting switch 48. Then, the probe 48s changes to a protruding state while coming into sliding contact with one of the one pair of inclining face parts 49s and switches the On/Off state of the shift operation detecting switch 48. In this way, the ECU 60 detects rotation from the neutral position D1 of the shift spindle 31, in other words, a transmission operation on the shift pedal 32. A rotation position (shift operation detecting position) D2 of the shift arm 31a at this time is a position rotated by a small angle θ1 of 2 to 3 degrees from the neutral position D1.

In addition, in FIGS. 6 and 8, although it is illustrated that On/Off is detected as On according to immersion of the probe 48s and Off according to protrusion thereof, On/Off may be detected as On according to the probe 48s coming into contact with the inclining face part 49s and Off according to no contact therebetween.

In this way, by disposing the detection target member 49 having the protruding apex part 49t in the outer peripheral end of the shift arm 31a extending to a further outer peripheral side than the shift spindle 31, the shift operation detecting switch 48 detects slight rotation of the shift spindle 31 according to a transmission operation on the shift pedal 32 with high sensitivity. In addition, compared to a case in which a transmission operation is detected on the basis of a shift operation load, a transmission operation can be detected on the basis of a rotation position of the shift arm 31a fixed to the shift spindle 31, and accordingly, detection can be performed with high sensitivity. In addition, a transmission operation can be more directly detected than in a case in which a displacement of an operation member (the shift drum 36 or the like) forming a body separate from the shift spindle 31 is detected.

<Clutch Control Mode>

Figure 13:
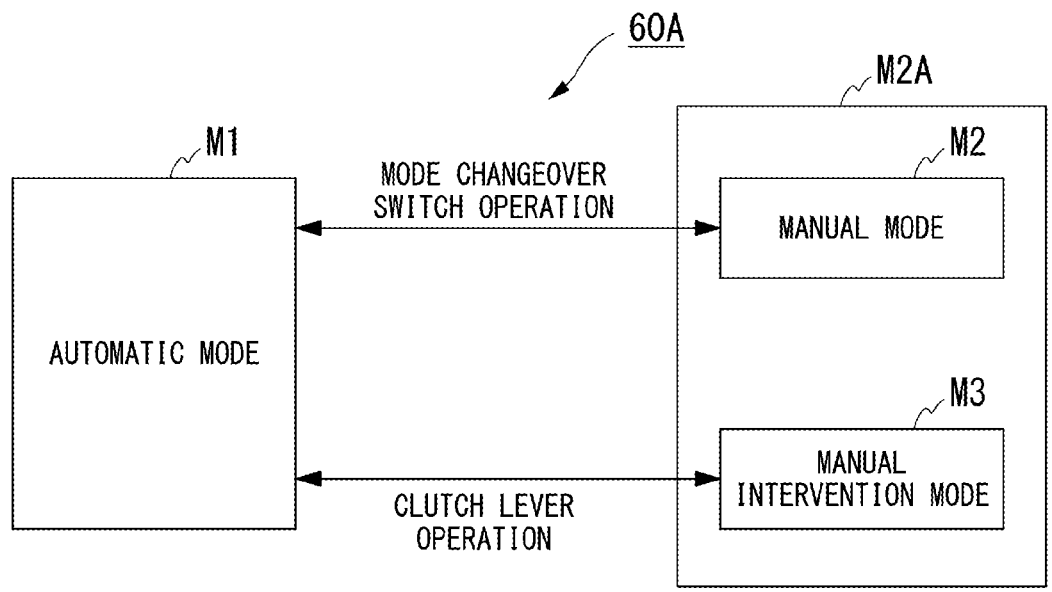
FIG. 13 is an explanatory diagram illustrating transitions in a clutch control mode according to this embodiment.

As illustrated in FIG. 13, a clutch control device 60A according to this embodiment has three types of clutch control modes. The clutch control mode appropriately transitions among three types of modes including an automatic mode M1 in which automatic control is performed, a manual mode M2 in which a manual operation is performed, and a manual intervention mode M3 in which a temporary manual operation is performed in accordance with operations of a clutch control mode changeover switch 59 (see FIG. 4) and a clutch lever (clutch operator) 4b (see FIG. 1). In addition, targets including the manual mode M2 and the manual intervention mode M3 will be referred to as a manual system M2A.

The automatic mode M1 is a mode in which the clutch device 26 is controlled by calculating a clutch capacity that is appropriate for a traveling state in accordance with automatic starting/transmission control. The manual mode M2 is a mode in which the clutch device 26 is controlled by calculating a clutch capacity in accordance with a vehicle occupant's clutch operation instruction. The manual intervention mode M3 is a temporary manual operation mode in which the clutch device 26 is controlled by accepting a clutch operation instruction from a vehicle occupant during the automatic mode M1 and calculating a clutch capacity from the clutch operation instruction. In addition, the manual intervention mode is set such that the mode is returned to the automatic mode M1 when the vehicle occupant stops (completely releases) the operation for a clutch lever 4b during the manual intervention mode M3.

The clutch control device 60A according to this embodiment generates a clutch control hydraulic pressure by driving an oil pump not illustrated in the drawing using a rotary driving force of the engine 13. For this reason, the clutch control device 60A starts control from a clutch off state (disconnected state) in the automatic mode M1 at the time of system starting. In addition, when the engine 13 is stopped, a clutch operation is unnecessary, and accordingly, the clutch control device 60A is set to return to clutch off in the automatic mode M1.

Basically, the automatic mode M1 automatically performs clutch control and enables the motorcycle 1 to travel without any lever operation. In the automatic mode M1, a clutch capacity is controlled using a throttle opening degree, an engine speed, a vehicle speed, and a shift sensor output. In this way, the motorcycle 1 can start without having an engine breakdown by performing only a throttle operation, and a gear change can be performed by performing only a shift operation. However, at the time of an extremely low speed corresponding to idling, the clutch device 26 may be automatically disconnected. In addition, by grasping the clutch lever 4b in the automatic mode M1, the mode is switched to the manual intervention mode M3, and the clutch device 26 can be arbitrarily disconnected as well.

On the other hand, in the manual mode M2, a clutch capacity is controlled by a vehicle occupant's lever operation. Switching between the automatic mode M1 and the manual mode M2 can be performed by operating the clutch control mode changeover switch 59 (see FIG. 4) during the stop of the vehicle. In addition, the clutch control device 60A may include an indicator representing validness of a lever operation at the time of transitioning to a manual system M2A (the manual mode M2 or the manual intervention mode M3).

In the manual mode M2, basically, clutch control is manually performed, and a clutch hydraulic pressure can be controlled in accordance with an operation angle of the clutch lever 4b. In this way, connection/disconnection of the clutch device 26 can be controlled in accordance with a vehicle occupant's intention, and the vehicle can travel with the clutch device 26 connected also at the time of an extremely low speed corresponding to idling. However, an engine breakdown may occur depending on a lever operation, and automatic starting using only a throttle operation cannot be performed. In addition, clutch control is automatically intervened at the time of performing a shift operation even in the manual mode M2.

In the automatic mode M1, although connection/disconnection of the clutch device 26 is automatically performed by the clutch actuator 50, by performing a manual clutch operation for the clutch lever 4b, a manual operation can be temporally intervened in the automatic control of the clutch device 26 (the manual intervention mode M3).

Figure 12:
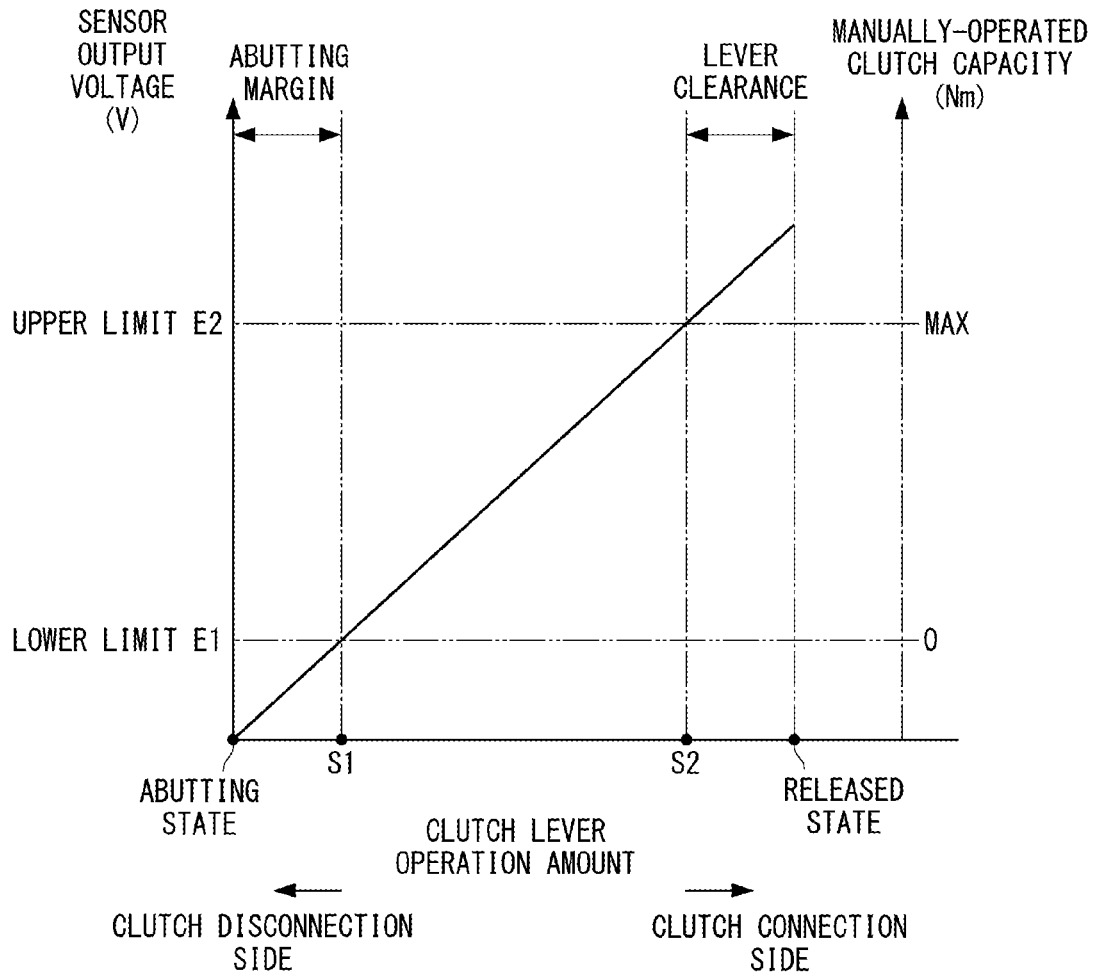
FIG. 12 is a graph illustrating correlations among an amount of an operation of a clutch lever, a sensor output voltage, and a clutch capacity according to this embodiment.

As illustrated in FIG. 12, an amount of operation (rotation angle) of the clutch lever 4b and an output value of the clutch lever operation amount sensor (clutch operation amount sensor) 4c are in a mutually proportional relation (correlation). The ECU 60 calculates a target hydraulic pressure of the clutch device 26 on the basis of an output value of a clutch lever operation amount sensor 4c.

Figure 11A:
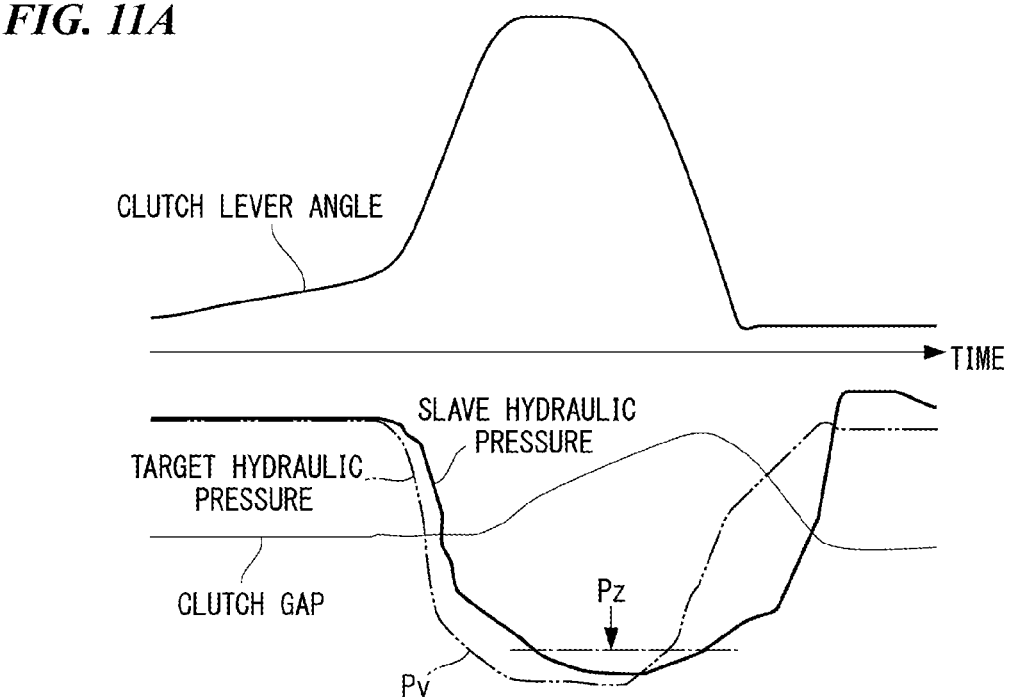
FIG. 11A is a timing diagram illustrating changes in control parameters of a clutch control device of a comparative example.

Referring also to FIG. 11A, even when a target hydraulic pressure is calculated on the basis of an amount of operation (clutch lever angle) of the clutch lever 4b, an actual hydraulic pressure (slave hydraulic pressure) generated in the slave cylinder 28 follows the target hydraulic pressure with a delay. In other words, due to an occurrence of a pressure drop in hydraulic piping between the clutch actuator 50 and the slave cylinder 28, a delay occurs in the following of a slave hydraulic pressure (furthermore, a clutch gap), which is a control target hydraulic pressure, for a target hydraulic pressure based on the amount of operation of the lever. In this way, when a delay of the control target hydraulic pressure with respect to the target hydraulic pressure occurs, a driver may feel inferiority of responsiveness of the clutch device 26. Control for solving this problem will be described later.

<Manual Clutch Operation>

As illustrated in FIG. 1, the clutch lever 4b as a clutch manual operator is mounted on the base side (an inner side in the vehicle width direction) of the left grip of the steering handle 4a. The clutch lever 4b has no mechanical connection with the clutch device 26 using a cable, a hydraulic pressure, or the like and functions as an operator transmitting a clutch operation request signal to the ECU 60. In other words, the motorcycle 1 employs a clutch-by-wire system in which the clutch lever 4b and the clutch device 26 are electrically connected to each other.

Referring also to FIG. 4, the clutch lever operation amount sensor 4c detecting the amount of operation (rotation angle) of the clutch lever 4b is integrally installed in the clutch lever 4b. The clutch lever operation amount sensor 4c converts the amount of operation of the clutch lever 4b into an electric signal and outputs the electric signal. In a state in which the operation of the clutch lever 4b is valid (the manual system M2A), the ECU 60 drives the clutch actuator 50 on the basis of an output of the clutch lever operation amount sensor 4c. In addition, the clutch lever 4b and the clutch lever operation amount sensor 4c may be formed as an integrated body or separate bodies from each other.

The motorcycle 1 includes the clutch control mode changeover switch 59 that switches between control modes of a clutch operation. The clutch control mode changeover switch 59 enables arbitrary switching between the automatic mode M1 in which clutch control is automatically performed under a predetermined condition and the manual mode M2 in which clutch control is manually performed in accordance with an operation of the clutch lever 4b. For example, the clutch control mode changeover switch 59 is installed in a handle switch attached to the steering handle 4a. Accordingly, a vehicle occupant can easily operate the clutch control mode changeover switch 59 at the time of normal driving.

Referring also to FIG. 12, the clutch lever 4b can rotate between a released state in which the clutch lever 4b is rotated to a clutch connection side by being released without being gripped by a vehicle occupant and an abutting state in which the clutch lever 4b abuts against the grip by being rotated to a grip side (clutch disconnection side) in accordance with vehicle occupant's gripping. When released from the vehicle occupant's gripping operation, the clutch lever 4b is biased to return to the released state that is an initial position.

For example, the clutch lever operation amount sensor 4c may be configured such that an output voltage is set to zero in a state in which the clutch lever 4b is completely grasped (the abutting state), and the output voltage increases in accordance with a release operation (an operation toward the clutch connection side) of the clutch lever 4b from this state. In this embodiment, a range acquired by excluding a lever play part present at the start of the grasping of the clutch lever 4b and an abutting clearance for securing a gap of a degree for which a finger enters between the grasped lever and the grip from the output voltage of the clutch lever operation amount sensor 4c is set to a range of valid voltages (a valid operation range of the clutch lever 4b).

More specifically, a range between an amount of operation S1 acquired when the clutch lever 4b is released by an amount corresponding to the abutting clearance from the state in which the clutch lever 4b abuts and an amount of operation S2 when the clutch lever 4b is released until an amount corresponding to the lever play part starts is set to be in correspondence with a lower limit value E1 to an upper limit value E2 of the valid voltage. This range of the lower limit value E1 to the upper limit value E2 corresponds to a range of zero to MAX of the calculated value of a manually-operated clutch capacity with a proportional relation. In this way, effects of a mechanical rattle, a sensor variation, and the like are reduced, and the reliability of the amount of driving the clutch requested by a manual operation can be improved. In addition, a voltage at the time of the amount of operation S1 of the clutch lever 4b may be set as an upper limit value E2 of the valid voltage, and a voltage at the time of the amount of operation S2 may be set as a lower limit value E1.

<Pressurization Control>

Figure 11B:
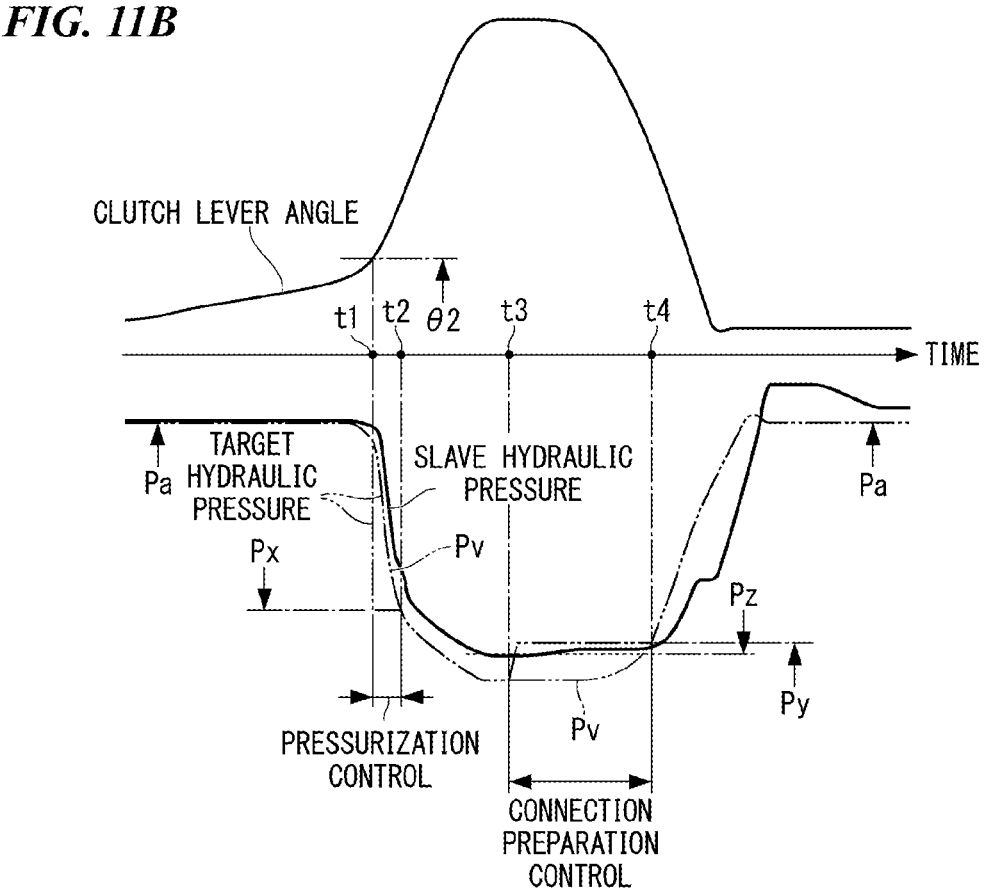
FIG. 11B is a timing diagram illustrating changes in control parameters of the clutch control device according to this embodiment.

Referring to FIGS. 11B and 13, the clutch control device 60A according to this embodiment performs pressurization control to be described below in detail when a clutch disconnecting operation according to a clutch lever operation in the manual intervention mode M3. The pressurization control is control in which a control target value (target hydraulic pressure) of the clutch capacity is set to a connection lower limit target hydraulic pressure (connection lower limit target value) Px acquired by changing an operation target hydraulic pressure (operation target value) Pv corresponding to the amount of operation of the clutch lever 4b to the clutch disconnection side in a case in which the amount of operation for the clutch lever 4b reaches a predetermined value set in advance (in a case in which the clutch lever 4b reaches a predetermined rotation angle (an intervention determination lever angle θ2)) on the basis of the output value of the clutch lever operation amount sensor 4c.

The intervention determination lever angle (intervention determination operation amount) θ2 corresponds to a lever operation angle when the clutch lever 4b is operated by an angle corresponding to a play part+α. The connection lower limit target hydraulic pressure Px corresponds to a target hydraulic pressure immediately before start of disconnection of the clutch device 26 (immediately before causing a slip). The operation target hydraulic pressure Pv corresponding to the amount of operation of the clutch lever 4b reaches the connection lower limit target hydraulic pressure Px when the clutch lever 4b is grasped further by a predetermined angle from the intervention determination lever angle θ2. A lever position at this time is set as the clutch disconnection position.

In this embodiment, the control target value of the clutch capacity is changed (decreased) to the connection lower limit target hydraulic pressure Px more quickly than the operation of the clutch lever 4b for the operation target hydraulic pressure Pv. Then, the clutch device 26 comes into a state immediately before disconnection in advance before the clutch lever 4b reaches the clutch disconnection position. For this reason, when the clutch lever 4b reaches the disconnection position, a delay in the disconnection of the clutch device 26 can be inhibited, disconnection performance (responsiveness) of the clutch device 26 at the time of intervention of the manual clutch operation is improved.

Next, one example of a process performed by the ECU 60 at the time of performing the pressurization control described above will be described with reference to a flowchart illustrated in FIG. 9. In a case in which the automatic mode M1 is selected, this control flow is repeatedly performed at a regulated control period (1 to 10 msec).

Figure 9:
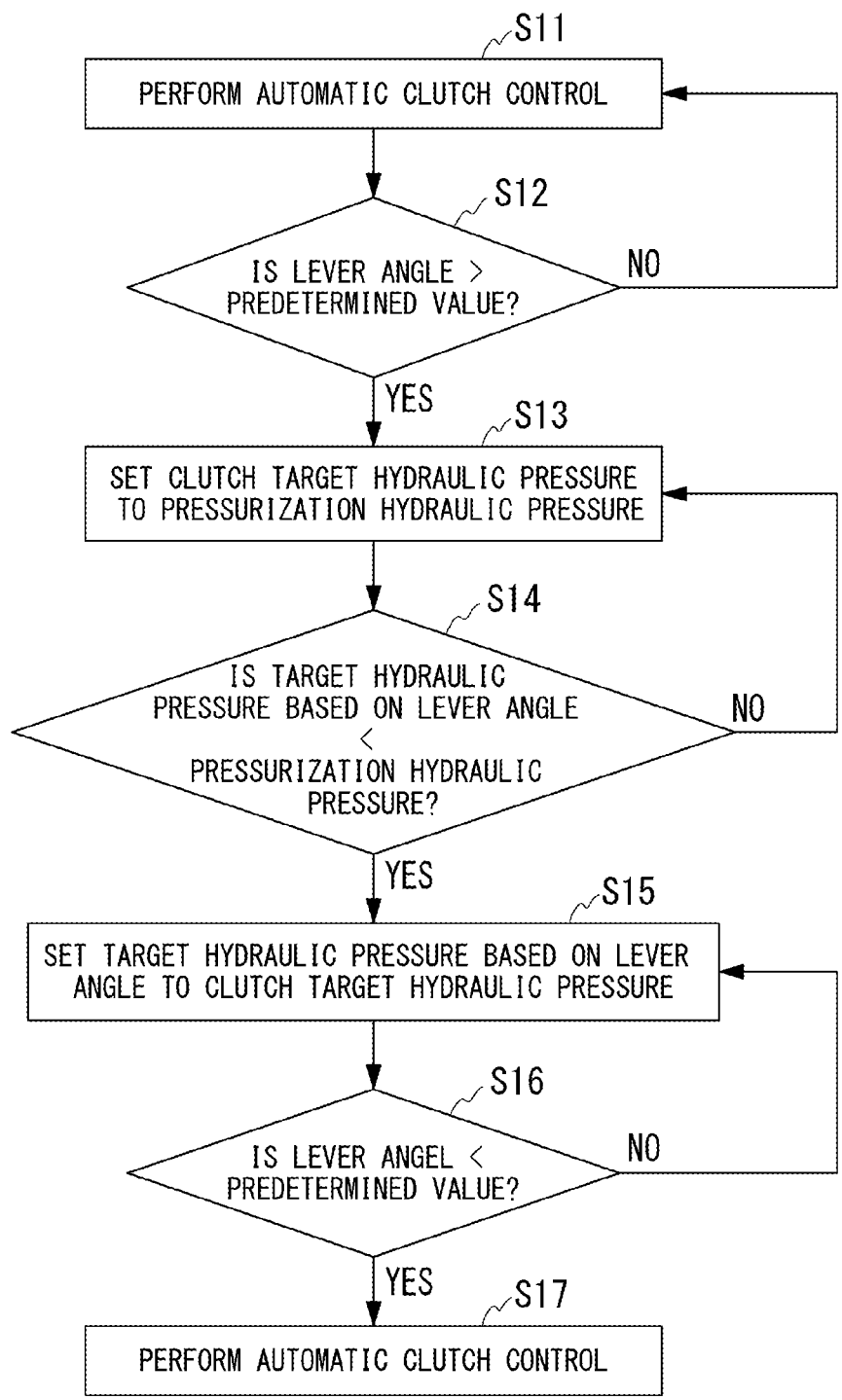
FIG. 9 is a flowchart illustrating the process of pressurization control in a clutch control device according to this embodiment.

As illustrated in FIG. 9, when the automatic mode M1 is selected, the ECU 60 executes automatic clutch control (Step S11).

Next, the ECU 60 determines whether or not the rotation angle of the clutch lever 4b exceeds a predetermined value set in advance (the intervention determination lever angle θ2; corresponding to an angle of the play part+α) (or equal to or larger than the predetermined value) (Step S12). In the case of "No" (the rotation angle is equal to or smaller than (or smaller than) the predetermined value) in Step S12, the process is returned to Step S11 (or the process temporarily stops). In the case of "Yes" (the rotation angle exceeds the predetermined value (or is equal to or larger than the predetermined value)) in Step S12, the process proceeds to the manual intervention mode M3.

At this time, first, the process proceeds to Step S13, and the pressurization hydraulic pressure (the connection lower limit target hydraulic pressure Px) set in advance is set to a clutch target hydraulic pressure (control target hydraulic pressure). The pressurization hydraulic pressure described above is a lower limit hydraulic pressure not causing a slip of the clutch device 26 and corresponds to the lower limit holding hydraulic pressure LP described above.

After Step S13, the ECU 60 causes the process to proceed to Step S14 and determines whether or not a target hydraulic pressure (the operation target hydraulic pressure Pv) based on the rotation angle of the clutch lever 4b is lower than (or equal to or lower than) the pressurization hydraulic pressure set in advance. In the case of "No" in Step S14 (or the operation target hydraulic pressure Pv is equal to or higher than the pressurization hydraulic pressure (or exceeds the pressurization hydraulic pressure)), the process is returned to Step S13 (or the process temporarily ends). In the case of "Yes" in Step S14 (or the operation target hydraulic pressure Pv is lower than (or is equal to or lower than) the pressurization hydraulic pressure), the process proceeds to Step S15, and the operation target hydraulic pressure Pv based on the rotation angle of the clutch lever 4b is set to a clutch target hydraulic pressure. In this way, the process proceeds to manual clutch control.

After Step S15, the ECU 60 causes the process to proceed to Step S16 and determines whether or not the rotation angle of the clutch lever 4b is lower than (or equal to or lower than) a predetermined value (the intervention determination lever angle θ2) set in advance. In the case of "No" (the rotation angle is equal to or larger than a predetermined value (or exceeds the predetermined value)) in Step S16, the process is returned to Step S15 (or the process ends temporarily). In the case of "Yes" (the rotation angle is smaller than (or is equal to or smaller than) a predetermined value) in Step S16, the clutch intervention operation ends, and the process is returned to the automatic clutch control (Step S17). In addition, after Step S15, connection preparation control to be described later may be performed.

<Connection Preparation Control>

Referring to FIGS. 11B and 13, at the time of performing a clutch disconnection operation according to a clutch lever operation in the manual intervention mode M3, the clutch control device 60A according to this embodiment performs connection preparation pressurization control to be described below in detail in a case in which a slave hydraulic pressure detected by the downstream-side hydraulic pressure sensor 58 reaches a disconnection determination hydraulic pressure (disconnection determination value) Pz set in advance. The connection preparation control is control in which a control target value (target hydraulic pressure) of the clutch capacity is set to the connection preparation target hydraulic pressure (connection preparation target value) Py acquired by causing the operation target hydraulic pressure Pv corresponding to the amount of operation of the clutch lever 4b to approach the disconnection determination hydraulic pressure Pz.

The disconnection determination hydraulic pressure Pz is a hydraulic pressure for which the clutch device 26 can be determined as being sufficiently disconnected (there is no transmission of torque) and is a hydraulic pressure immediately before the start of connection of the clutch device 26. The connection preparation target hydraulic pressure Py corresponds to a target hydraulic pressure immediately before start of connection of the clutch device 26 (immediately before transmission of torque) and is approximated as the disconnection determination hydraulic pressure Pz (the disconnection determination hydraulic pressure Pz+α). The operation target hydraulic pressure Pv corresponding to the amount of operation of the clutch lever 4b is below the disconnection determination hydraulic pressure Pz when the clutch lever 4b is completed grasped. The slave hydraulic pressure decreases toward the disconnection determination hydraulic pressure Pz with being delayed from the operation target hydraulic pressure Pv. When the slave hydraulic pressure reaches the disconnection determination hydraulic pressure Pz, a target hydraulic pressure is steely increased for the operation target hydraulic pressure Pv that is below the disconnection determination hydraulic pressure Pz, and the target hydraulic pressure is set to the connection preparation target hydraulic pressure Py. When the clutch lever 4b is rotated by a predetermined amount in a releasing direction (a clutch connecting direction) from a completed-grasped state, it is returned to a prior clutch connection position. The prior clutch connection position is a lever position at which the operation target hydraulic pressure Pv becomes the connection preparation target hydraulic pressure Py.

In this embodiment, the control target value of the clutch capacity changes (increases) with being separated from the operation of the clutch lever 4b such that it is maintained at the connection preparation target hydraulic pressure Py immediately before the start of connection of the clutch device 26. Then, before the clutch lever 4b returns to the position before connection of the clutch from the grasping position, the target hydraulic pressure changes to the connection preparation target hydraulic pressure Py in advance. For this reason, when the clutch lever 4b is returned to the connection position, a delay in the connection of the clutch device 26 is inhibited, and the connection performance (responsiveness) of the clutch device 26 at the time of intervention of the manual clutch operation is improved.

Next, one example of a process performed by the ECU 60 at the time of the connection preparation control described above will be described with reference to a flowchart illustrated in FIG. 10. This control flow is repeatedly executed at a regulated control period (1 to 10 msec) in a case in which the automatic mode M1 is selected.

Figure 10:
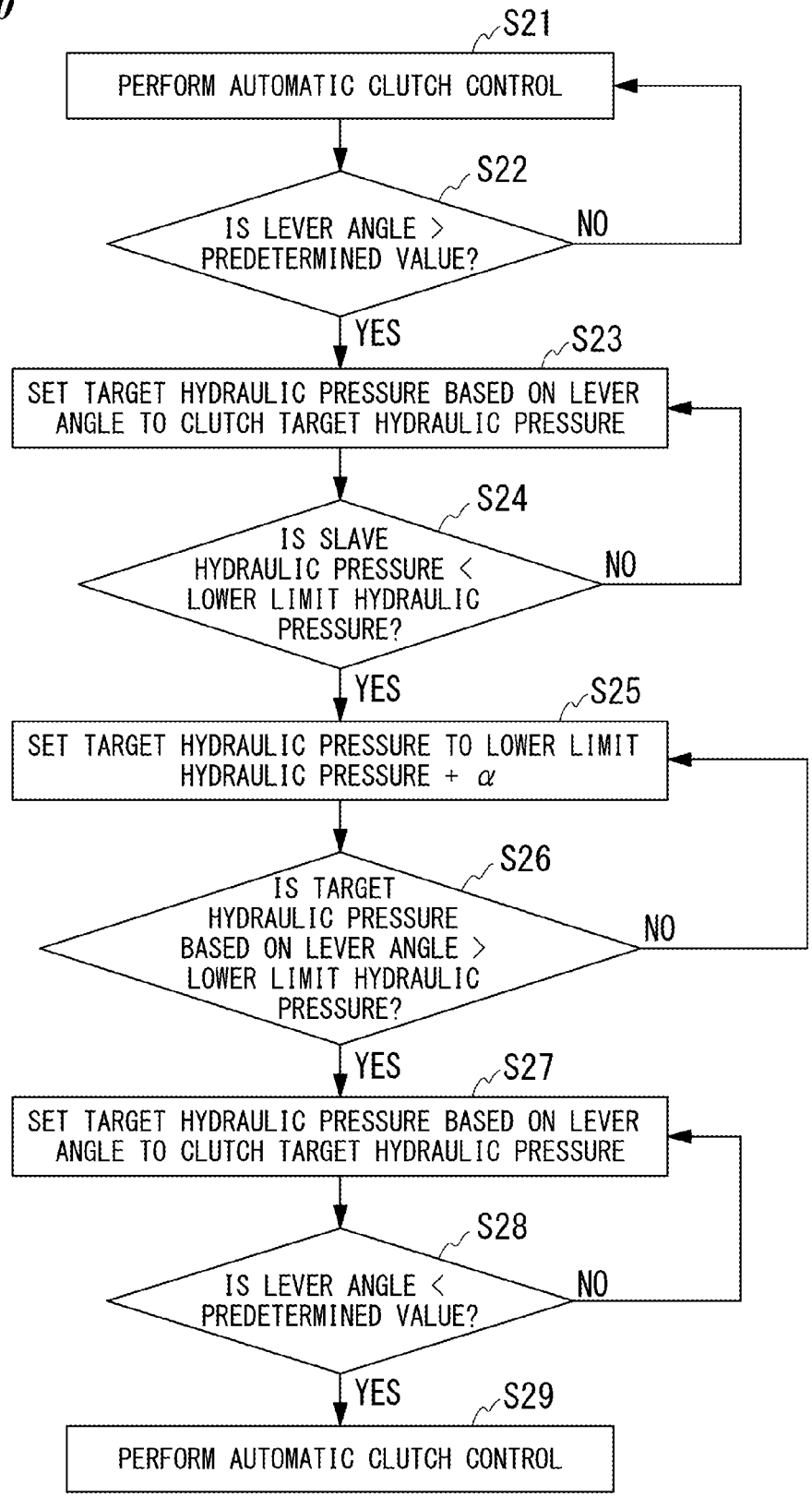
FIG. 10 is a flowchart illustrating the process of connection preparation control in the clutch control device according to this embodiment.

As illustrated in FIG. 10, when the automatic mode M1 is selected, the ECU 60 executes automatic clutch control (Step S21).

Thereafter, the ECU 60 determines whether or not the rotation angle of the clutch lever 4b exceeds a predetermined value (the intervention determination lever angle θ2; corresponding to an angle of the play part+α) (or is equal to or larger than the predetermined value) set in advance (Step S22). In the case of "No" in Step S22 (the rotation angle is equal to or smaller than (or smaller than) the predetermined value), the process is returned to Step S21 (or the process temporarily ends). In the case of "Yes" in Step S22 (the rotation angle exceeds the predetermined value (or equal to or larger than the predetermined value)), the process proceeds to the manual intervention mode M3.

At this time, in FIG. 10, the process proceeds to Step S23, and the operation target hydraulic pressure Pv based on the rotation angle of the clutch lever 4b is set to a clutch target hydraulic pressure (the control target hydraulic pressure). In this way, the process proceeds to manual clutch control. In addition, the pressurization control described above may be performed after Step S22.

After Step S23, the ECU 60 causes the process to proceed to Step S24 and determines whether or not the hydraulic pressure (the slave hydraulic pressure) of the slave cylinder 28 is lower than (or equal to or lower than) a lower limit hydraulic pressure (the disconnection determination hydraulic pressure Pz) set in advance. The lower limit hydraulic pressure is a hydraulic pressure for which it can be determined that the clutch device 26 is sufficiently disconnected (there is no transmission of torque). In the case of "No" in Step S24 (the slave hydraulic pressure is equal to or higher than the lower limit hydraulic pressure (or exceeds the lower limit hydraulic pressure)), the process is returned to Step S23 (or the process temporarily ends). In the case of "Yes" in Step S24 (the slave hydraulic pressure is lower than (or equal to or lower than) the lower limit hydraulic pressure), the clutch device 26 is sufficiently disconnected, and the process proceeds to Step S25. In Step S25, the clutch target hydraulic pressure is set to the lower limit hydraulic pressure+α (the connection preparation target hydraulic pressure Py).

After Step S25, the ECU 60 causes the process to proceed to Step S26 and determines whether or not the operation target hydraulic pressure Pv based on the rotation angle of the clutch lever 4b exceeds the lower limit hydraulic pressure (or equal to or higher than the lower limit hydraulic pressure). In the case of "No" in Step S26 (the operation target hydraulic pressure Pv is equal to or lower than (or lower than) the lower limit hydraulic pressure), the process is returned to Step S25 (or the process temporarily ends). In the case of "Yes" in Step S26 (the operation target hydraulic pressure Pv exceeds the lower limit hydraulic pressure (or is equal to or higher than the lower limit hydraulic pressure)), the process proceeds to Step S27, and the operation target hydraulic pressure Pv based on the rotation angle of the clutch lever 4b is set to the clutch target hydraulic pressure.

After Step S27, the ECU 60 causes the process to proceed to Step S28 and determines whether or not the rotation angle of the clutch lever 4b becomes smaller than (or equal to or smaller than) a predetermined value (the intervention determination lever angle θ2) set in advance. In the case of "No" in Step S28 (the rotation angle is equal to or larger than the predetermined value (or exceeds the predetermined value)), the process is returned to Step S27 (or the process temporarily ends). In the case of "Yes" in Step S28 (the rotation angle is smaller than (or equal to or smaller than) the predetermined value), the clutch intervention operation ends, and the process is returned to the automatic clutch control (Step S29).

<Temporal Change in Clutch Control Parameter>

One example of temporal changes in clutch control parameters will be described with reference to FIGS. 11A and 11B.

Referring to a comparative example illustrated in FIG. 11A, when the clutch is engaged in the automatic mode M1, in a case in which an operation of grasping the clutch lever 4b is performed, the rotation angle of the clutch lever 4b increases. The clutch actuator 50 operates to be linked with an operation (an increase in the rotation angle) of this clutch lever 4b, and the target hydraulic pressure (a control target value of the slave hydraulic pressure) of clutch control is decreased in accordance with a change in the amount of operation (the rotation angle) of the clutch lever 4b. In other words, the operation target hydraulic pressure Pv is decreased. In this way, the clutch device 26 operates in the disconnection direction.

In addition, when a release operation from the grasping of the clutch lever 4b is performed, the rotation angle of the clutch lever 4b decreases. The clutch actuator 50 operates to be linked with an operation (a decrease in the rotation angle) of the clutch lever 4b, and the target hydraulic pressure of the clutch control (a control target value of the slave hydraulic pressure) is increased in accordance with a change in the amount of operation (rotation angle) of the clutch lever 4b. In other words, the operation target hydraulic pressure Pv is increased. In this way, the clutch device 26 is operated in a connecting direction.

At this time, the target hydraulic pressure (the operation target hydraulic pressure Pv) is controlled to be changed in proportion to the amount of change in the lever angle. In other words, the target hydraulic pressure is controlled to have a change of 1:1 with respect to the lever angle.

Meanwhile, a slave hydraulic pressure (and a clutch gap) that is an actual control target changes to the target hydraulic pressure with a delay in accordance with the effect of resistance (a pressure drop) inside a hydraulic pressure passage from the clutch actuator 50 to the slave cylinder 28. In this way, a slight operation delay of the clutch device 26 with respect to the operation of the clutch lever 4b occurs, and a driver may feel poor disconnection and a poor joint of the clutch device 26.

Referring to FIG. 11B, in this embodiment, immediately after a lever disconnecting operation, control (pressurization control) is performed such that the target hydraulic pressure changes (decreases) more quickly than the operation target hydraulic pressure Pv until the clutch capacity becomes the connection lower limit target hydraulic pressure Px corresponding to the lower limit hydraulic pressure instead of having a change of 1:1 with respect to the lever angle.

For example, in a case in which a clutch intervention operation is performed in the automatic mode M1, a disconnection operation according to the clutch lever 4b from the clutch fastened state is detected, and, when the lever angle reaches a predetermined value (the intervention determination lever angle θ2) set in advance (timing t1), the process proceeds to the pressurization control described above. In other words, after the timing t1 described above, the target hydraulic pressure is lowered until it becomes the connection lower limit target hydraulic pressure Px corresponding to the lower limit hydraulic pressure such that the clutch capacity is decreased in a range in which the clutch device 26 does not slip.

In this way, the slave hydraulic pressure changes to a hydraulic pressure (the connection lower limit target hydraulic pressure Px) immediately before the start of disconnection of the clutch device 26 at a timing that is quicker than a timing for following the operation target hydraulic pressure Pv, and the clutch device 26 changes to a state immediately before the start of disconnection (a disconnection preparing state). In other words, even when there is a pressure drop in the clutch hydraulic pressure passage, a delay in the following of the slave hydraulic pressure for the target hydraulic pressure is inhibited, and a delay in the operation of the clutch device 26 can be inhibited. For this reason, compared to a case in which hydraulic pressure control of 1:1 with respect to the lever angle is maintained, a time required for clutch disconnection is shortened, and it becomes difficult for a driver to feel poor disconnection of the clutch device 26 at the time of performing a disconnection operation. In other words, the disconnection responsiveness of the clutch device 26 can be improved.

Thereafter, at a time point at which the operation target hydraulic pressure Pv reaches a pressurization hydraulic pressure (timing t2), the pressurization control described above ends, and the process is returned to the hydraulic pressure control based on the operation target hydraulic pressure Pv. In this way, the clutch device 26 can be proportionally disconnected in accordance with a lever operation. Before/after the manual intervention control, the control target value of the clutch capacity is set to an automatic control target hydraulic pressure (automatic control target value) Pa that is separated from the manual clutch operation.

In addition, referring to the comparative example illustrated in FIG. 11A, while the clutch lever 4b is grasped, the clutch device 26 is constantly controlled in the releasing direction. Accordingly, after the clutch device 26 is disconnected (after the slave hydraulic pressure decreases to the disconnection determination hydraulic pressure Pz), the slave hydraulic pressure further decreases. Then, when the clutch device 26 is reconnected, a time requires until the slave hydraulic pressure rises to a connection hydraulic pressure, and accordingly, a deviation from the target hydraulic pressure becomes large as well.

Referring to FIG. 11B, in this embodiment, control (connection preparation control) in which, when the slave hydraulic pressure reaches a disconnection determination hydraulic pressure Pz (a hydraulic pressure for which the clutch device 26 is determined as being sufficiently disconnected) set in advance, control of the clutch device 26 in the releasing direction (control of a decrease in the slave hydraulic pressure) is stopped regardless of the lever angle, and the target hydraulic pressure is maintained at a predetermined value (the connection preparation target hydraulic pressure Py) set in advance is performed.

For example, in a case in which a clutch intervention operation is performed in the automatic mode M1, a disconnection operation according to the clutch lever 4b is performed, and, when a slave hydraulic pressure following the operation target hydraulic pressure Pv reaches a predetermined value (the disconnection determination hydraulic pressure Pz) set in advance (timing t3), the process proceeds to the connection preparation control described above. In other words, at the timing t3 described above, after the slave hydraulic pressure reaches the disconnection determination hydraulic pressure Pz, the target hydraulic pressure is raised to the connection preparation target hydraulic pressure Py corresponding to the disconnection determination hydraulic pressure Pz+α such that the clutch capacity is not decreased any more.

In this way, a further decrease in the slave hydraulic pressure can be inhibited after the clutch device 26 is disconnected, and a time required for reconnecting the clutch device 26 is shortened. In other words, even when there is a pressure drop in the clutch hydraulic pressure passage, a delay in the following of the slave hydraulic pressure for the target hydraulic pressure can be inhibited, and a delay in the operation of the clutch device 26 can be inhibited. For this reason, compared to a case in which hydraulic pressure control of 1:1 with respect to the lever angle is maintained, a time required for reconnecting the clutch is shortened, and it becomes difficult for a driver to feel poor connection of the clutch device 26 at the time of performing a connection operation. In other words, the responsiveness of the connection of the clutch device 26 can be improved.

Thereafter, at a time point (timing t4) at which the operation target hydraulic pressure Pv becomes above the disconnection determination hydraulic pressure Pz, the connection preparation control described above ends, and the process is returned to the hydraulic pressure control based on the operation target hydraulic pressure Pv. In this way, the clutch device 26 can be proportionally connected in accordance with a lever operation. Before/after the manual intervention control, a control target value of the clutch capacity is set to the automatic control target hydraulic pressure Pa separated from the manual clutch operation.

Although control in which the target hydraulic pressure is set to a predetermined value corresponding to the disconnection determination hydraulic pressure Pz at a time point at which the target hydraulic pressure calculated by the control device reaches the disconnection determination hydraulic pressure Pz may be considered, reach of the slave hydraulic pressure following a lever operation with a delay at the disconnection determination hydraulic pressure Pz becomes delayed. In other words, since there is a friction (oil flow resistance) of the oil path, unless the clutch actuator 50 is driven by lowering the target hydraulic pressure than the disconnection determination hydraulic pressure Pz, reach of the slave hydraulic pressure at the disconnection determination hydraulic pressure Pz is delayed.

As described above, the clutch control device 60A according to the embodiment described above includes the engine 13, the transmission gear 21, the clutch device 26 that connects/disconnects power transmission between the engine 13 and the transmission gear 21, the clutch actuator 50 that changes a clutch capacity by driving the clutch device 26, the ECU 60 that calculates a control target value of the clutch capacity, the clutch lever 4b that is able to manually operate the clutch device 26, and the clutch lever operation amount sensor 4c that converts the amount of operation of the clutch lever 4b into an electric signal. The ECU 60 enables intervention of a manual clutch operation according to the clutch lever 4b during automatic control of the clutch device 26 according to the clutch actuator 50, and, at the time of performing a clutch disconnection operation through intervention of a manual clutch operation, in a case in which the amount of operation of the clutch lever 4b based on an output value of the clutch lever operation amount sensor 4c reaches a predetermined value (the intervention determination lever angle θ2) set in advance, the ECU 60 sets a control target value of the clutch capacity to the connection lower limit target hydraulic pressure Px acquired by changing the operation target hydraulic pressure Pv corresponding to the amount of operation of the clutch lever 4b to the clutch disconnection side.

According to this configuration, the control target value of the clutch capacity can be changed more quickly than the operation of the clutch lever 4b until the clutch capacity becomes the connection lower limit target hydraulic pressure Px corresponding to the lower limit value immediately before the start of disconnection of the clutch device 26 (immediately before a slip). In other words, the clutch device 26 can be caused to be in a prior disconnected state in advance before the operation position of the clutch lever 4b reaches the clutch disconnection position. For this reason, a delay in the operation of the clutch device 26 for the disconnection operation of the clutch lever 4b can be inhibited, and the disconnection performance (responsiveness) of the clutch device 26 at the time of intervention of the manual clutch operation can be improved.

In the clutch control device 60A described above, in a case in which the operation target hydraulic pressure Pv exceeds the connection lower limit target hydraulic pressure Px on the clutch disconnection side in a state in which the control target value of the clutch capacity is set to the connection lower limit target hydraulic pressure Px, the ECU 60 causes the process to proceed to clutch control based on the operation target hydraulic pressure Pv.

According to this configuration, in a case in which the operation target hydraulic pressure Pv corresponding to the amount of operation of the clutch lever 4b exceeds the connection lower limit target hydraulic pressure Px to the clutch disconnection side, the clutch capacity is controlled on the basis of the operation target hydraulic pressure Pv, and accordingly, a user can perform a disconnection operation of the clutch device 26 in proportion to the amount of operation by performing a manual clutch operation.

In the clutch control device 60A described above, in a case in which the clutch lever 4b is operated to the clutch connection side and exceeds the intervention determination lever angle θ2 on the basis of an output value of the clutch lever operation amount sensor 4c, the ECU 60 sets the control target value of the clutch capacity to the automatic control target hydraulic pressure Pa separated from the manual clutch operation.

According to this configuration, in a case in which the clutch lever 4b is operated to the clutch connection side and reaches a predetermined lever angle, the intervention of the manual clutch operation is regarded to end in accordance with a user request, and the process can be continuously switched to automatic control.

In the clutch control device 60A described above, the connection lower limit target hydraulic pressure Px is a value for which the clutch device 26 does not slip (a value for which a gap is not generated in the clutch device 26).

According to this configuration, the disconnection of the clutch device 26 can be started immediately after a state in which the clutch device 26 is completely connected, and, the clutch device 26 can be disconnected quickly such that a user request is reflected after the operation target hydraulic pressure exceeds the connection lower limit target hydraulic pressure Px in accordance with a user operation.

In addition, the clutch control device 60A described above further includes the control parameter sensor (the downstream-side hydraulic pressure sensor) 58 that detects an actual control parameter (a slave hydraulic pressure) for the control target value of the clutch capacity, and, in a case in which the control parameter detected by the control parameter sensor reaches the disconnection determination hydraulic pressure Pz set in advance at the time of performing a clutch disconnection operation according to the intervention of a manual clutch operation, the ECU 60 sets the control target value of the clutch capacity to the connection preparation target hydraulic pressure Py acquired by causing the operation target hydraulic pressure Pv corresponding to the amount of operation of the clutch lever 4b to approach the disconnection determination hydraulic pressure Pz.

According to this configuration, the control target value of the clutch capacity can be changed with being separated from the operation of the clutch lever 4b such that it is maintained at the connection preparation target hydraulic pressure Py corresponding to a target value immediately before the start of connection of the clutch device 26. In other words, before the operation position of the clutch lever 4b is returned to the clutch connection position after disconnection of the clutch, the clutch device 26 can be caused to be in the state immediately before the start of the connection in advance. For this reason, a delay in the operation of the clutch device 26 for the operation of the clutch lever 4b can be inhibited, and the connection performance (responsiveness) of the clutch device 26 at the time of intervention of the manual clutch operation can be improved.

In the clutch control device 60A described above, in a case in which the operation target hydraulic pressure $Pv$ exceeds the connection preparation target hydraulic pressure $Py$ on the clutch connection side in the clutch disconnected state according to the intervention of a manual clutch operation, the ECU 60 causes the process to proceed to clutch control based on the operation target hydraulic pressure $Pv$.

According to this configuration, in a case in which the operation target hydraulic pressure $Pv$ corresponding to the amount of operation of the clutch lever 4b exceeds the connection preparation target hydraulic pressure $Py$ on the clutch connection side, by controlling the clutch capacity on the basis of the operation target hydraulic pressure $Pv$, a user can perform an operation of connecting the clutch device 26 in proportion to the amount of operation using a manual clutch operation.

In the clutch control device 60A described above, the disconnection determination hydraulic pressure $Pz$ is a value for which it can be determined that there is no dragging in the clutch device 26 (a value for which a sufficient gap is generated in the clutch device 26).

According to this configuration, the connection preparation target hydraulic pressure $Py$ can be set immediately before the state in which the clutch device 26 is completely disconnected, and, after the operation target hydraulic pressure exceeds the connection preparation target hydraulic pressure $Py$ in accordance with a user operation, the clutch device 26 can be connected quickly such that a user request is reflected.

The present invention is not limited to the embodiment described above and, for example, is not limited to a configuration in which the clutch is connected in accordance with an increase in the hydraulic pressure, and the clutch is disconnected in accordance with a decrease in the hydraulic pressure but may be also applied to a configuration in which the clutch is disconnected in accordance with an increase in the hydraulic pressure, and the clutch is connected in accordance with a decrease in the hydraulic pressure.

The clutch operator is not limited to the clutch lever but may be any one of various operators such as a clutch pedal and the like.

The application is not limited to a saddle riding-type vehicle in which the clutch operation is automated as in the embodiment and can be applied also to a saddle riding-type vehicle including a so-called clutch operation-less transmission device in which transmission can be performed by adjusting a driving force without performing a manual clutch operation under a predetermined condition while the manual clutch operation is basically performed.

In addition, the saddle riding-type vehicle includes vehicles in general in which a driver gets over a vehicle body, includes not only a motorcycle (including a motor-attached bicycle and a scooter-type vehicle) but also three-wheel (including a vehicle having one front wheel and two rear wheels and a vehicle having two front wheels and one rear wheel) or four-wheel vehicle, and also includes a vehicle including an electric motor in a motor.

The components in the embodiment described above are examples of the present invention, and various changes can be made in a range not departing from the concept of the present invention.

BRIEF DESCRIPTION OF THE REFERENCE SYMBOLS

1: Motorcycle (saddle riding-type vehicle)
4b: Clutch lever (clutch operator)
4c: Clutch lever operation amount sensor (clutch operation amount sensor)
13: Engine
21: Transmission gear
26: Clutch device
50: Clutch actuator
58: Control parameter sensor (downstream-side hydraulic pressure sensor)
60: ECU (control unit)
60A: Clutch control device
$\theta 2$: Intervention determination lever angle (intervention determination operation amount)
$Pv$: Operation target hydraulic pressure (operation target value)
$Px$: Connection lower limit target hydraulic pressure (connection lower limit target value)
$Pa$: Automatic control target hydraulic pressure (automatic control target value)
$Pz$: Disconnection determination hydraulic pressure (disconnection determination value)
$Py$: Connection preparation target hydraulic pressure (connection preparation target value)

What is claim is:

1. A clutch control device comprising:
    an engine;
    a transmission gear;
    a clutch device that is configured to connect/disconnect transmission of power between the engine and the transmission gear;
    a clutch actuator that is configured to change a clutch capacity by driving the clutch device;
    a control unit that is configured to calculate a control target value of the clutch capacity;
    a control parameter sensor that is configured to detect an actual control parameter for the control target value;
    a clutch operator that is configured to enable the clutch device to be manually operated; and
    a clutch operation amount sensor that is configured to convert an amount of operation of the clutch operator into an electric signal,
    wherein the control unit is configured to enable intervention of a manual clutch operation according to the clutch operator during automatic control of the clutch device according to the clutch actuator, and
    wherein the control unit is configured to set the control target value of the clutch capacity to a connection preparation target value acquired by causing an operation target value corresponding to the amount of operation of the clutch operator to approach a disconnection determination value in a case in which the control parameter detected by the control parameter sensor reaches the disconnection determination value set in advance at a time of performing a clutch disconnection operation through intervention of the manual clutch operation.

2. The clutch control device according to claim 1, wherein the control unit is configured to transition to clutch control based on the operation target value in a case in which the operation target value exceeds the connection preparation target value to a clutch connection side in a clutch disconnected state formed through the intervention of the manual clutch operation.

3. The clutch control device according to claim 1, wherein the control unit is configured to set the control target value of the clutch capacity to an automatic control target value separated from the manual clutch operation in a case in which the clutch operator is operated to a clutch connection side and exceeds an intervention determination operation amount on the basis of an output value of the clutch operation amount sensor.

4. The clutch control device according to claim 1, wherein the disconnection determination value is a value at which it can be determined that there is no dragging in the clutch device.

5. The clutch control device according to claim 1, wherein the clutch operator is a clutch lever, and an operation of the clutch lever is detected using a rotation angle of the clutch lever.

6. The clutch control device according to claim 1, wherein the clutch capacity is controlled using hydraulic pressure.

7. The clutch control device according to claim 6, wherein the clutch capacity decreases and disconnects the clutch device when the hydraulic pressure is lowered.

* * * * *